US010258868B2

(12) United States Patent
Yamaguchi

(10) Patent No.: US 10,258,868 B2
(45) Date of Patent: Apr. 16, 2019

(54) GAME TABLE

(71) Applicant: Universal Entertainment Corporation, Koto-ku, Tokyo (JP)

(72) Inventor: Shinsuke Yamaguchi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 287 days.

(21) Appl. No.: 15/111,934

(22) PCT Filed: Jan. 6, 2015

(86) PCT No.: PCT/JP2015/050104
§ 371 (c)(1),
(2) Date: Jul. 15, 2016

(87) PCT Pub. No.: WO2015/115123
PCT Pub. Date: Aug. 6, 2015

(65) Prior Publication Data

US 2016/0346669 A1 Dec. 1, 2016

(30) Foreign Application Priority Data

Jan. 29, 2014 (JP) ................................ 2014-014852
Jan. 29, 2014 (JP) ................................ 2014-014853
Jan. 29, 2014 (JP) ................................ 2014-014854

(51) Int. Cl.
*G06F 17/00* (2006.01)
*A63F 1/06* (2006.01)
*G07F 17/32* (2006.01)

(52) U.S. Cl.
CPC ............ *A63F 1/067* (2013.01); *G07F 17/322* (2013.01); *G07F 17/3206* (2013.01); *G07F 17/3248* (2013.01)

(58) Field of Classification Search
None
See application file for complete search history.

(56) References Cited

U.S. PATENT DOCUMENTS 2,102,449 A * 12/1937 Zimmerman .......... A47B 25/00 108/63
2,827,352 A * 3/1958 Boyajian .................. A47B 3/10 108/35
3,188,158 A * 6/1965 Sanchez ................. A47B 3/002 108/124

(Continued)

FOREIGN PATENT DOCUMENTS

JP 2005111223 4/2005
JP 2012075781 4/2012
JP 2013-222237 10/2013

OTHER PUBLICATIONS

International Search Report, Int. App No. PCT/JP2015050104, dated Mar. 24, 2015.

*Primary Examiner* — Paul A D'Agostino
(74) *Attorney, Agent, or Firm* — Simpson & Simpson, PLLC; S. Peter Konzel

(57) ABSTRACT

Provided is a game table which allows maintenance to be facilitated. The game table includes: a game board having arranged thereon antennas for reading identification information stored in game chips through wireless communication; and a game board mounting table top having mounted thereon the game board so as to allow the game board to be opened and closed.

16 Claims, 26 Drawing Sheets

(56) References Cited

U.S. PATENT DOCUMENTS

| | | | | | |
|---|---|---|---|---|---|
| 3,227,105 | A * | 1/1966 | Braude | A47B 25/00 | 108/13 |
| 3,899,178 | A * | 8/1975 | Watanabe | A63F 9/28 | 273/144 A |
| 4,838,179 | A * | 6/1989 | Bing | A47B 3/0918 | 108/116 |
| 5,556,094 | A * | 9/1996 | Shiledar Baxi | A63F 7/0668 | 273/108.5 |
| 6,267,671 | B1 * | 7/2001 | Hogan | A63F 3/00157 | 463/25 |
| 6,419,224 | B1 * | 7/2002 | Tsai | A63D 15/04 | 273/108.1 |
| 6,766,747 | B1 * | 7/2004 | Wolfe | A47B 13/081 | 108/26 |
| 7,387,299 | B1 * | 6/2008 | Voden | A63F 3/00895 | 273/285 |
| 7,575,240 | B1 * | 8/2009 | Voden | A47B 3/083 | 273/309 |
| 7,637,827 | B2 * | 12/2009 | Bangerter | A47B 25/003 | 473/496 |
| 2007/0057469 | A1 * | 3/2007 | Grauzer | G07F 17/32 | 273/309 |
| 2009/0017889 | A1 * | 1/2009 | Zhukov | A63F 3/00643 | 463/14 |
| 2012/0080845 | A1 | 4/2012 | Emori et al. | | |
| 2013/0207345 | A1 | 8/2013 | Gelinotte et al. | | |
| 2013/0270342 | A1 | 10/2013 | Koyama | | |
| 2014/0235308 | A1 * | 8/2014 | Hoyt | A63F 9/20 | 463/11 |

* cited by examiner

GAME TABLE

TECHNICAL FIELD

The present invention relates to a game table which can be installed in a game facility such as a casino.

BACKGROUND ART

In a game facility such as a casino, by using game chips and cards such as playing cards, a variety of games such as blackjack and baccarat are played. In order to smoothly conduct the above-mentioned game, a game table is used in a game facility. A dealer and players face each other, with the game table sandwiched therebetween, and on the game table, game chips are dealt and collected. In addition, the cards such as the playing cards are also dealt and collected on the game table.

In the above-mentioned game table, antennas for reading the game chips through wireless communication and driving circuits or the like for driving the antennas are provided. In order for the antennas to appropriately read chip information of the game chips placed on the game table, it is required for the antennas to be provided as close as possible to a surface of the game table. In addition, it is also required to reduce influence exerted on the driving circuits or the like by noise. Therefore, the antennas, the driving circuits, and the like are embedded into the game table in an integrated manner over the whole lower portion of the surface of the game table (for example, refer to Patent Literature 1).

In addition, in the game table, antennas for reading RFID IC tags of the game chips through wireless communication and transmitter-receiver circuits for the wireless communication are provided. On the game table, electromagnetic waves are outputted from the antennas, and the wireless communication with the RFID IC tags of the game chips is thereby performed. Therefore, on the game table, power supply wires for supplying current to the antennas in order to output the electromagnetic waves from the antennas, signal wires for performing the wireless communication, and conductive wires such as wires for a variety of kinds of control are arranged (for example, refer to Patent Literature 1).

Further, it is often the case that in a game facility where the above-mentioned game table is installed, 24-hour business is operated, as in a casino, a hotel, and the like. Accordingly, in a game facility, also on the game table, the variety of games are played night and day. Therefore, on the game table, between a dealer and players, the game chips are continuously dealt and collected. In addition, in a game facility, at a cashier, exchange between cash and the game chips is also continuously performed.

CITATION LIST

Patent Literature

Patent Literature 1: U. S. Patent Application Publication No. 2012/0252564

SUMMARY OF THE INVENTION

Technical Problem

Devices such as the antennas are electric components, and various kinds of maintenance such as various kinds of adjustment such as adjustment of sensitivities of the antennas and replacement of components are required. When for the conventional game table, the above-mentioned maintenance is performed, it is required to disassemble the game table. However, because the game table is large and heavy, there may be a case where a plurality of people have to disassemble and move the game table, thereby making the maintenance cumbersome.

In addition, as described above, on the game table, metal conductors such as the power supply wires for supplying the current to the antennas, the signal wires, and various kinds of control wires are arranged. In this way, since on the game table, the metal conductors are present in the vicinity of the antennas, it has been difficult to maintain matching states of the antennas in appropriate states. Further, it is required to provide the antennas so as to correspond to a plurality of bet regions or the like, and it is also required to provide a plurality of antennas for the game table. Therefore, when the work to provide the antennas for the game table is done and the maintenance for the antennas is performed, it has been required to individually adjust the matching states of the plurality of antennas.

As described above, in a game facility operating the 24-hour business, between a dealer and players, the game chips are continuously moved. In addition, in a game facility, a plurality of game tables are installed, games are separately proceeding in parallel on these game tables, and respective timings at which the game chips are moved are different from one another on the game tables. Therefore, it has been difficult to make constant timings at which revenue and expenditure accounts are calculated.

In consideration of the above-described viewpoints, the present invention was made, and an objective of the present invention is to provide a game table allowing the maintenance to be facilitated.

Further, another objective of the present invention, is to provide a game table which is capable of maintaining matching states of a plurality of antennas when the antennas are arranged on a game table and maintenance for the antennas is performed.

Furthermore, further another object of the present invention is to provide a game table which is capable of calculating revenue and expenditure accounts at appropriate timing.

Solution to Problem

A first aspect of the present invention is a game table configured to include:

- a game board having arranged thereon antennas for reading identification information stored in game chips through wireless communication; and
- a game board mounting table top having mounted thereon the game board so as to allow the game board to be opened and closed.

Since the game board can be opened and closed with respect to the game board mounting table top, the game board can be opened without detaching the game board from the game board mounting table top, thereby allowing maintenance of the game table including the game board, the game board mounting table top, and the like to be facilitated.

In a second aspect of the present invention, the antennas are configured to be arranged on a reverse surface of the game board.

By opening the game board with respect to the game board mounting table top, the antennas provided on the reverse surface of the game board can be located at desired positions such as a height of a line of sight of a worker. The worker can perform the maintenance in comfortable posture without the need to bend down, thereby allowing an efficiency of the maintenance to be enhanced.

A third aspect of the present invention is configured to further include an opening and closing coupling device for coupling the game board to the game board mounting table top so as to allow the game board to be opened and closed.

Since the game board is coupled to the game board mounting table top by the opening and closing coupling devices so as to allow the game board to be opened and closed, an opening and closing operation of the game board can be made constant.

A fourth aspect of the present invention is configured to further include an opening auxiliary device for setting a state in which a space is formed between the game board and the game board mounting table top, from a state in which the game board is closed.

Since the space can be formed between the game board and the game board mounting table top by the opening auxiliary device, an operator such as a store employee uses the formed space, for example, puts his or her hand or the like into the space and can open the game board, thereby allowing work of opening the game board to be facilitated.

A fifth aspect of the present invention is configured to further include an opening and closing braking device for braking an opening and closing operation of the game board, the opening and closing braking device being arranged between the game board and the game board mounting table top.

The opening and closing of the game board can be braked, thereby preventing the game board from being suddenly opened or closed and allowing the maintenance to be facilitated.

A sixth aspect of the present invention is configured to further include an opening and closing auxiliary device for assisting the opening and closing operation of the game board, the opening and closing auxiliary device being arranged between the game board and the game board mounting table top.

Since the opening and closing of the game board can be assisted, the game board can be opened and closed without exerting a large force on the game board, and workability is enhanced, thereby allowing the maintenance to be facilitated.

A seventh aspect of the present invention is configured to include: a dealer side on which a dealer is situated; and a player side on which players are situated, and the game board is configured to be openable on the player side.

On the game board, a larger number of devices, which require the maintenance, are likely to be attached on the player side than on the dealer side. The game board is configured to allow the game board to be opened on the player side, thereby preventing the maintenance on the player side from becoming cumbersome and allowing the maintenance to be facilitated.

An eighth aspect of the present invention is a game table configured to include an antenna module including: a plurality of antennas for reading identification information stored in game chips through wireless communication; and a housing for housing the plurality of antennas.

Since the plurality of antennas are modularized as the antenna module; to provide the plurality of antennas for the game table, it is not required to individually provide the antennas, and it is only required to provide each antenna module for the game table. In addition, to perform maintenance related to the antennas, it is only required to replace the antenna module. Therefore, without individually adjusting matching states of the plurality of antennas, the matching states of the plurality of antennas in the antenna module can be maintained.

A ninth aspect of the present invention is configured to further include a game board on which game chips are placed in a plurality of game regions associated with a plurality of players, the antenna module being configured to be detachably arranged on the game board so as to correspond to each of the plurality of game regions.

The antenna module is detachably arranged so as to correspond to each of the plurality of game regions. Therefore, it is only required to replace an antenna module corresponding to antennas and transmitter-receiver circuit boards which need to be replaced, thereby allowing maintenance of the game table to be facilitated.

In a 10th aspect of the present invention, the antenna module is configured to include:

an adjusting part for adjusting electromagnetic waves outputted from each of the antennas; and a through hole formed at a position corresponding to a position of the adjusting part.

When electrical adjustment of the antennas is performed, a worker can adjust an adjusting part corresponding an antenna which needs to be adjusted by using a tool such as a driver via the through hole. Accordingly, even in a case where the antenna module which has been adjusted is provided for the game table, a need for adjustment may arise due to the presence of the metal conductors in the vicinity of the antennas or posterior attachment of other parts. In such a case as well, it is only required to adjust the adjusting part via the through hole, thereby allowing the electromagnetic waves outputted from the antennas to be easily adjusted.

In a 11th aspect of the present invention, the game board is configured to include:

a dealer side on which a dealer is situated; and a player side on which players are situated so as to face the dealer side, the game board being configured to be openable on the player side, the plurality of game regions being configured to be arranged along the player side.

The antenna module is arranged on the game board so as to correspond to each of the plurality of game regions along the player side, and the game board can be opened on the player side. Therefore, when the game board is opened, the antenna modules arranged along the player side can be located at easy-to-work positions such as a position of a line of sight of a worker, thereby allowing the maintenance to be facilitated.

A 12th aspect of the present invention is a game table configured to include:

a registration antenna for reading chip identification information to identify game chips used in a casino and for validating the game chips; and an erasure antenna for reading the chip identification information and for invalidating the game chips.

The registration antenna validates the game chips and the erasure antenna invalidates the game chips. Therefore, the processing for the game chips used in a casino can be performed by classifying the game chips into the validated game chips and the invalidated game chips. Accordingly, since in a casino, amounts of only the validated game chips having monetary values can be calculated, thereby allowing revenue and expenditure accounts to be calculated at arbitrary timing.

In addition, a 13th aspect of the present invention is configured to further include a reference antenna for reading the chip identification information, the registration antenna and the erasure antenna being configured to be arranged so as to sandwich the reference antenna between the registration antenna and the erasure antenna.

Since the registration antenna and the erasure antenna are arranged so as to sandwich the reference antenna therebetween, a dealer can clearly recognize the registration antenna and the erasure antenna, thereby allowing a human error to be prevented from occurring. Since the reference antenna reads the chip identification information, a dealer can recognize whether or not the game chips are validated.

A 14th aspect of the present invention is configured to further include an operation switch for setting the reference antenna in an operating state.

Since the reference antenna can be operated only when needed, interference of electromagnetic waves by the reference antenna can be prevented, thereby allowing reading of the other antennas to be made fast.

A 15th aspect of the present invention is configured to further include a chip tray used by a dealer for containing the game chips, the reference antenna being configured to be arranged so as to be sandwiched between the chip tray and player bet regions.

Since the reference antenna is arranged so as to be sandwiched between the chip tray and the player bet regions, a dealer can confirm a validation state by the reference antenna before the game chips are dealt to players from the chip tray and can confirm an invalidation state by the reference antenna before the game chips are contained into the chip tray from players, thereby allowing a human error to be prevented from occurring.

Advantageous Effects of the Invention

The maintenance of a game table can be facilitated. In addition, when antennas are arranged on the game table and maintenance for the antennas is performed, matching states of a plurality of antennas can be maintained. Further, revenue and expenditure accounts can also be calculated at appropriate timing.

DESCRIPTION OF EMBODIMENTS

Outline of First Embodiment

Figure 1:
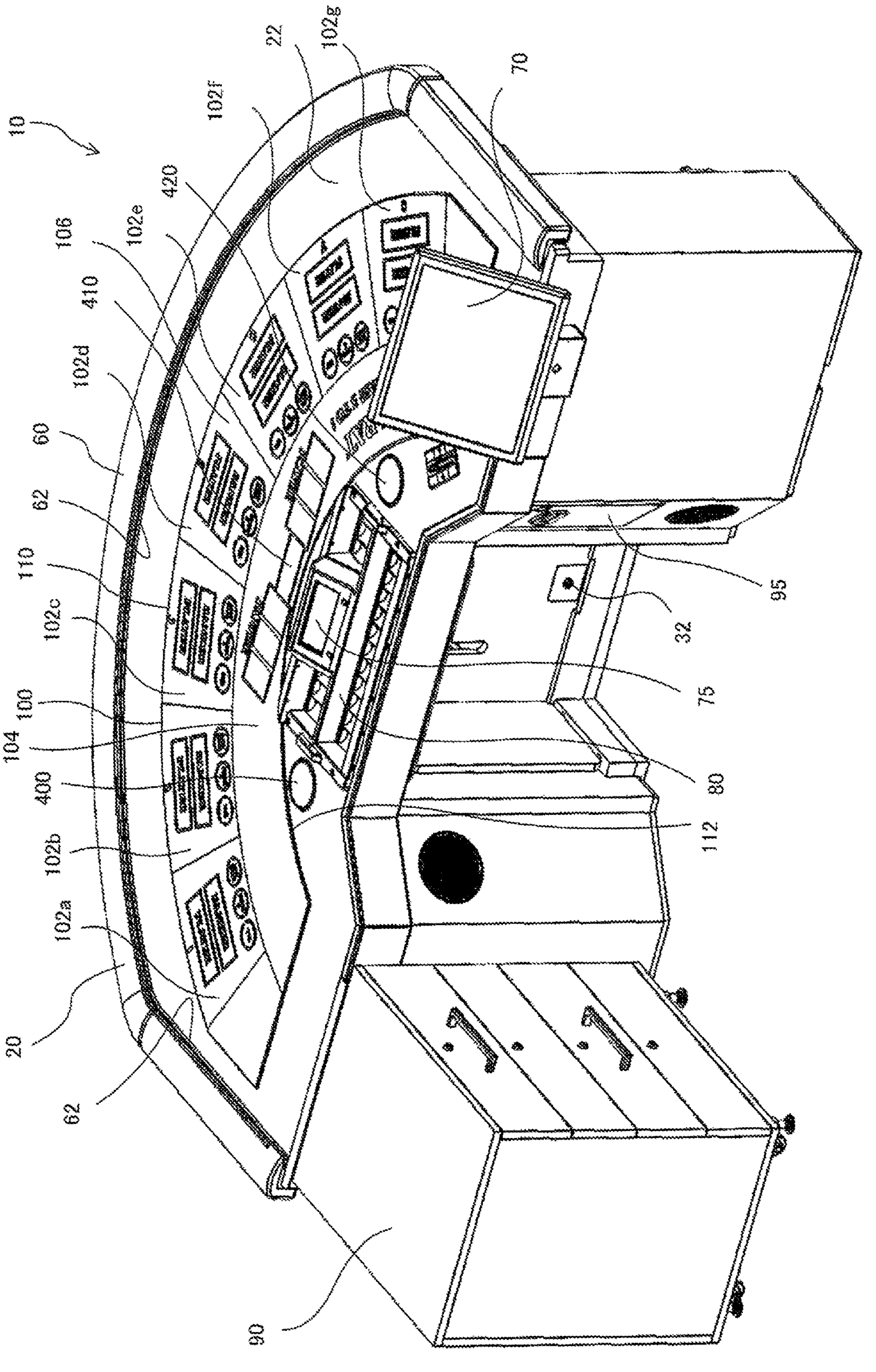
FIG. 1 is a perspective view of a game table, viewed from a dealer side.

A game table according to a first embodiment includes:

a game board having arranged thereon antennas for reading identification information stored in game chips through wireless communication; and a game board mounting table top having mounted thereon the game board so as to allow the game board to be opened and closed.

Since the game board can be opened and closed with respect to the game board mounting table top, the game board can be opened without detaching the game board from the game board mounting table top, thereby allowing maintenance of the game table including the game board, the game board mounting table top, and the like to be facilitated.

Further, in the game table according to the first embodiment, the antennas are arranged on a reverse surface of the game board.

By opening the game board with respect to the game board mounting table top, the antennas provided on the reverse surface of the game board can be located at desired positions such as a height of a line of sight of a worker. The worker can perform the maintenance in comfortable posture without the need to bend down, thereby allowing an efficiency of the maintenance to be enhanced.

Further, the game table according to the first embodiment further includes opening and closing coupling devices for coupling the game board to the game board mounting table top so as to allow the game board to be opened and closed.

Since the game board is coupled to the game board mounting table top by the opening and closing coupling devices so as to allow the game board to be opened and closed, an opening and closing operation of the game board can be made constant.

Further, the game table according to the first embodiment further includes an opening auxiliary device for setting a state in which a space is formed between the game board and the game board mounting table top, from a state in which the game board is closed.

Since the space can be formed between the game board and the game board mounting table top by the opening auxiliary device, an operator such as a store employee uses the formed space, for example, puts his or her hand or the like into the space and can open the game board, thereby allowing work of opening the game board to be facilitated.

Further, the game table according to the first embodiment further includes an opening and closing braking device for braking the opening and closing operation of the game board, the opening and closing braking device being arranged between the game board and the game board mounting table top.

The opening and closing of the game board can be braked, thereby preventing the game board from being suddenly opened or closed and allowing the maintenance to be facilitated.

Further, the game table according to the first embodiment further includes an opening and closing auxiliary device for assisting the opening and closing operation of the game board, the opening and closing auxiliary device being arranged between the game board and the game board mounting table top.

Since the opening and closing of the game board can be assisted, the game board can be opened and closed without exerting a large force on the game board, and workability is enhanced, thereby allowing the maintenance to be facilitated.

Further, in the game table according to the first embodiment, the game board has: a dealer side on which a dealer is situated; and a player side on which players are situated, and the game board can be opened on the player side.

On the game board, a larger number of devices, which require the maintenance, are likely to be attached on the player side than on the dealer side. The game board is configured to allow the game board to be opened on the player side, thereby preventing the maintenance on the player side from becoming cumbersome and allowing the maintenance to be facilitated.

Outline of Second Embodiment

A game table according to a second embodiment including an antenna module having: a plurality of antennas for reading identification information stored in game chips through wireless communication; and a housing for housing the plurality of antennas.

Since the plurality of antennas are modularized as the antenna module; to provide the plurality of antennas for the game table, it is not required to individually provide the antennas, and it is only required to provide each antenna module for the game table. In addition, to perform maintenance related to the antennas, it is only required to replace the antenna module. Therefore, without individually adjusting matching states of the plurality of antennas, the matching states of the plurality of antennas in the antenna module can be maintained.

Further, the game table according to the second embodiment further includes a game board on which the game chips are placed in a plurality of game regions associated with a plurality of players, the antenna module being detachably arranged on the game board so as to correspond to each of the plurality of game regions.

The antenna module is detachably arranged so as to correspond to each of the plurality of game regions. Therefore, it is only required to replace an antenna module corresponding to antennas and transmitter-receiver circuit boards which need to be replaced, thereby allowing maintenance of the game table to be facilitated.

Further, in the game table according to the second embodiment, the antenna module has: an adjusting part for adjusting electromagnetic waves outputted from each of the antennas; and a through hole formed at a position corresponding to a position of the adjusting part.

To perform electrical adjustment of the antennas, a worker can adjust an adjusting part corresponding an antenna which needs to be adjusted by using a tool such as a driver via the through hole. Accordingly, even in a case where the antenna module which has been adjusted is provided for the game table, a need for adjustment may arise due to the presence of metal conductors in the vicinity of the antennas or posterior attachment of other parts. In such a case as well, it is only required to adjust the adjusting part via the through hole, thereby allowing the electromagnetic waves outputted from the antennas to be easily adjusted.

Further, in the game table according to the second embodiment, the game board include: a dealer side on which a dealer is situated; and a player side on which players are situated so as to face the dealer side, the game board being openable on the player side, and the plurality of game regions being arranged along the player side.

The antenna module is arranged on the game board so as to correspond to each of the plurality of game regions along the player side, and the game board can be opened on the player side. Therefore, when the game board is opened, the antenna modules arranged along the player side can be located at easy-to-work positions such as a position of a line of sight of a worker, thereby allowing the maintenance to be facilitated.

Outline of Third Embodiment

A game table according to a third embodiment includes:

a registration antenna for reading chip identification information to identify game chips used in a casino and for validating the game chips; and an erasure antenna for reading the chip identification information and for invalidating the game chips.

The registration antenna validates the game chips and the erasure antenna invalidates the game chips. Therefore, the processing for the game chips used in a casino can be performed by classifying the game chips into the validated game chips and the invalidated game chips. Accordingly, since in a casino, amounts of only the validated game chips having monetary values can be calculated, thereby allowing revenue and expenditure accounts to be calculated at arbitrary timing.

Further, the game table according to the third embodiment further includes a reference antenna for reading the chip identification information, and the registration antenna and the erasure antenna are arranged so as to sandwich the reference antenna between the registration antenna and the erasure antenna.

Since the registration antenna and the erasure antenna are arranged so as to sandwich the reference antenna therebetween, a dealer can clearly recognize the registration antenna and the erasure antenna, thereby allowing a human error to be prevented from occurring. Since the reference antenna reads the chip identification information, a dealer can recognize whether or not the game chips are validated.

Further, the game table according to the third embodiment further includes an operation switch for setting the reference antenna in an operating state.

Since the reference antenna can be operated only when needed, interference of electromagnetic waves by the reference antenna can be prevented, thereby allowing reading of the other antennas to be made fast.

Further, the game table according to the third embodiment further includes a chip tray used by a dealer for containing the game chips, and the reference antenna is arranged so as to be sandwiched between the chip tray and player bet regions.

Since the reference antenna is arranged so as to be sandwiched between the chip tray and the player bet regions, a dealer can confirm a validation state by the reference antenna before the game chips are dealt to players from the chip tray and can confirm an invalidation state by the reference antenna before the game chips are collected from players and contained into the chip tray from players, thereby allowing a human error to be prevented from occurring.

Embodiment of Game Table 10

Hereinafter, with reference to FIG. 1 to FIG. 26, an embodiment of a game table 10 will be described.

Figure 2:
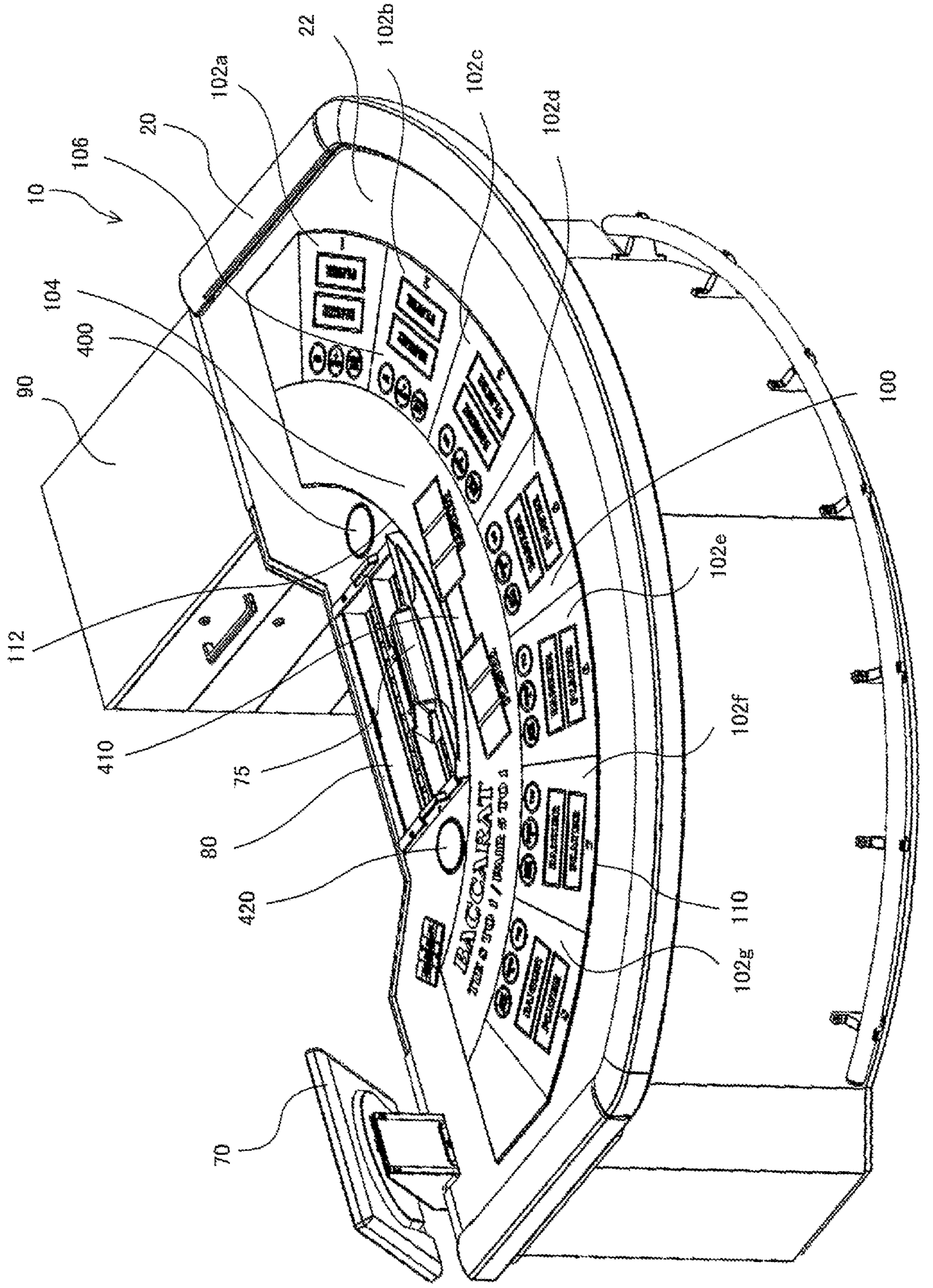
FIG. 2 is a perspective view of the game table, viewed from a player side.
Figure 3:
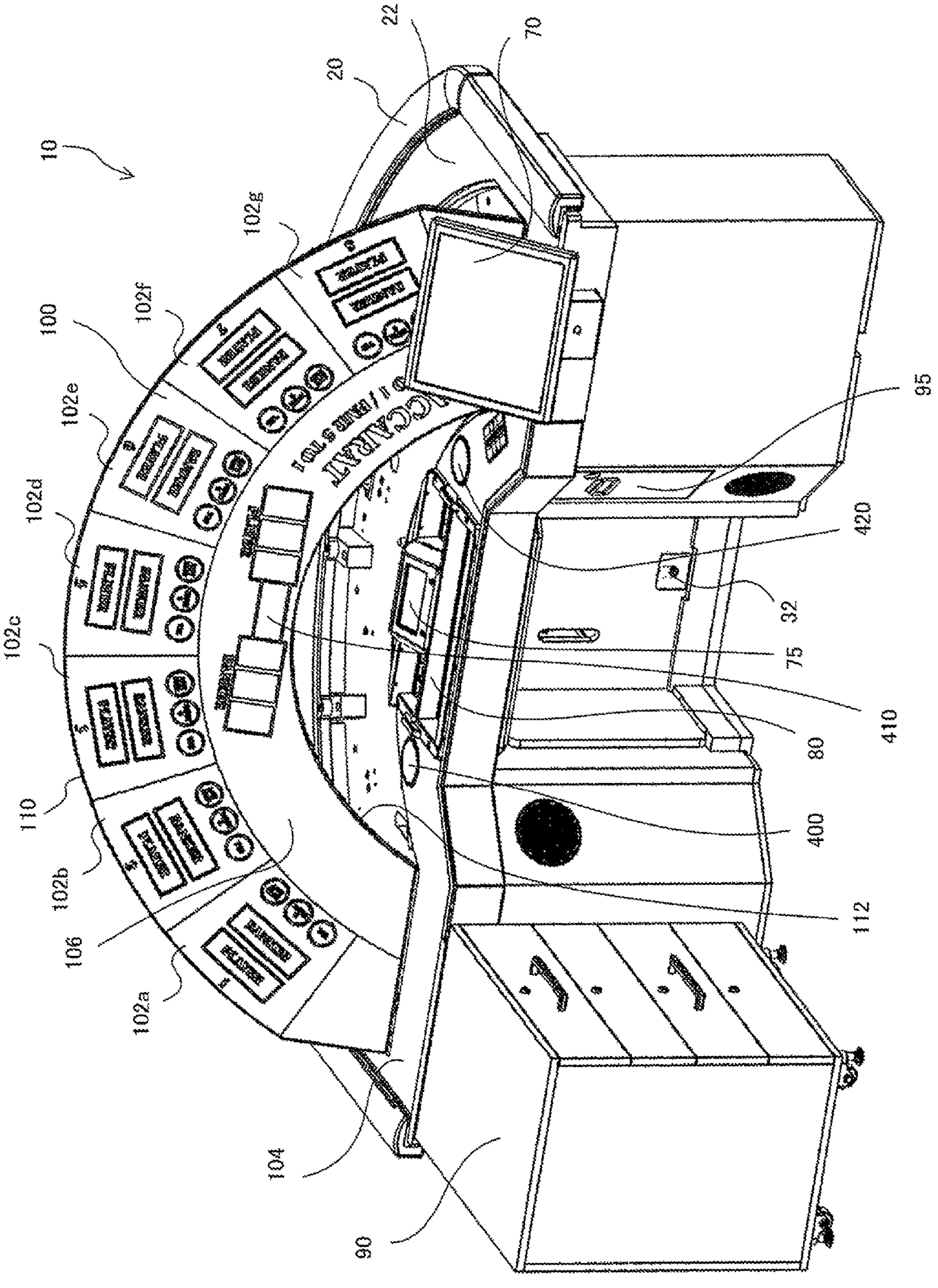
FIG. 3 is a perspective view of the game table in a state in which a game board is opened, viewed from the dealer side.
Figure 4:
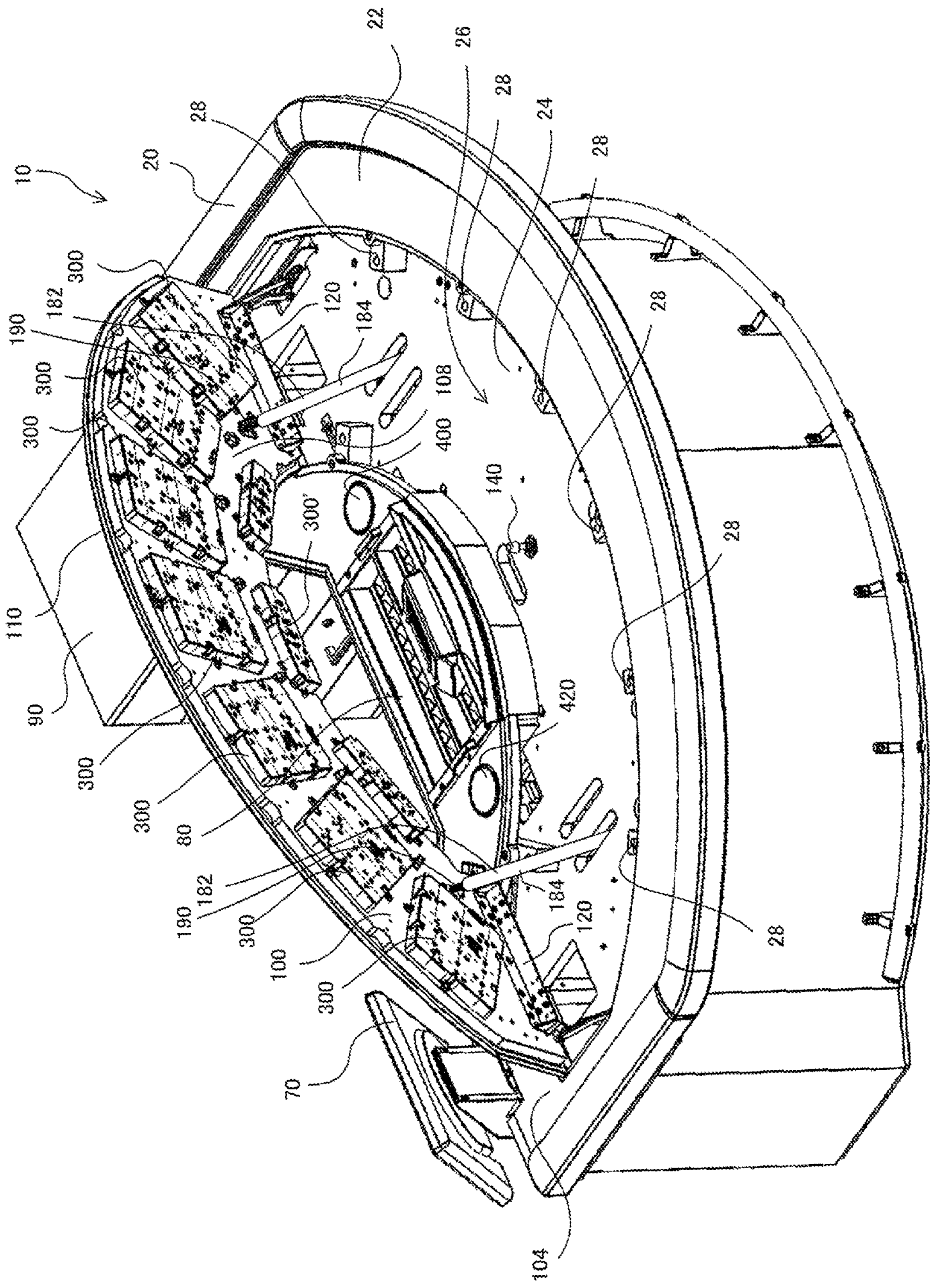
FIG. 4 is a perspective view of the game table in the state in which the game board is opened, viewed from the player side.
Figure 5:
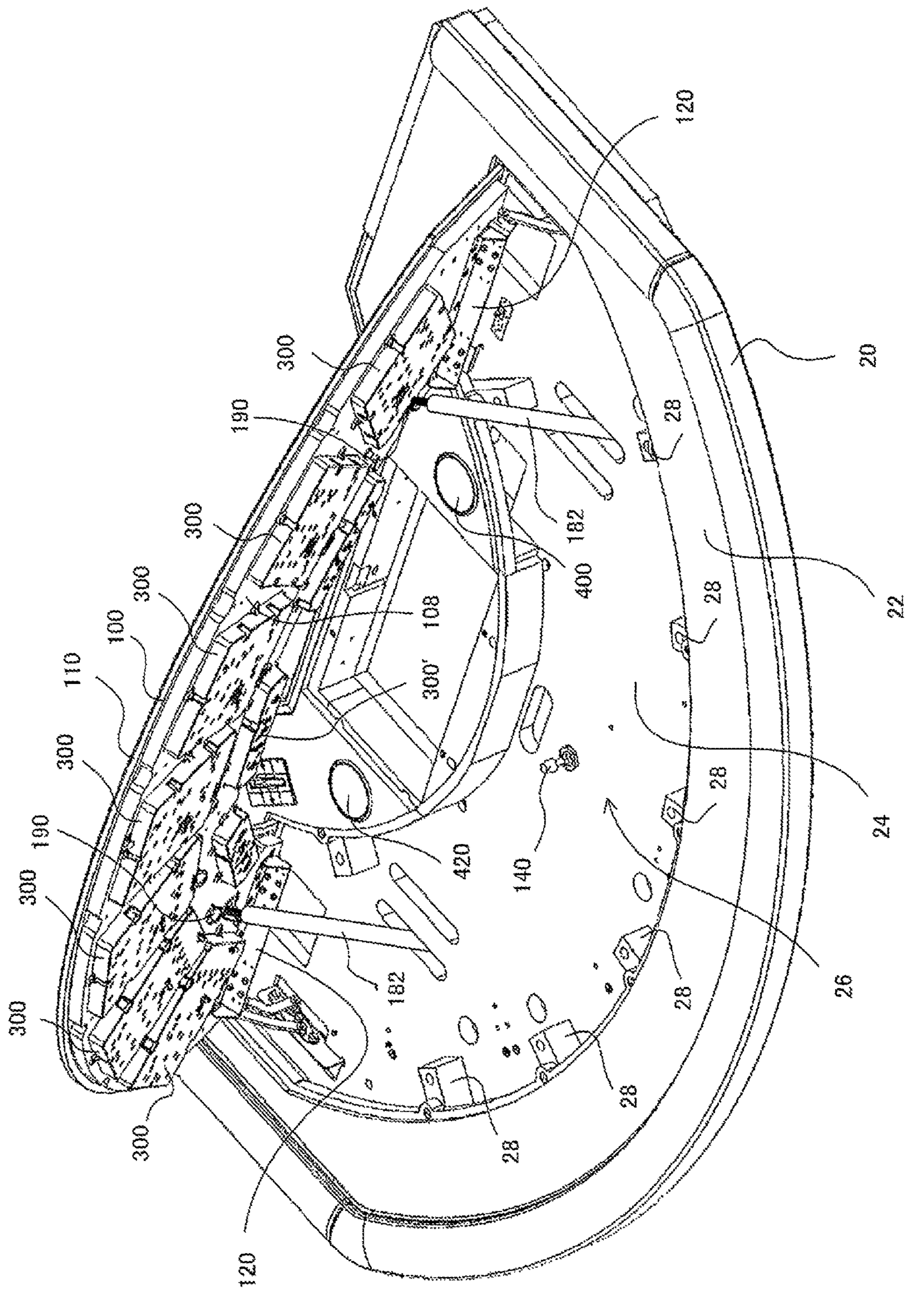
FIG. 5 is a perspective view illustrating an inside of an upper side of a top board of the game table in the state in which the game board is opened.
Figure 6:
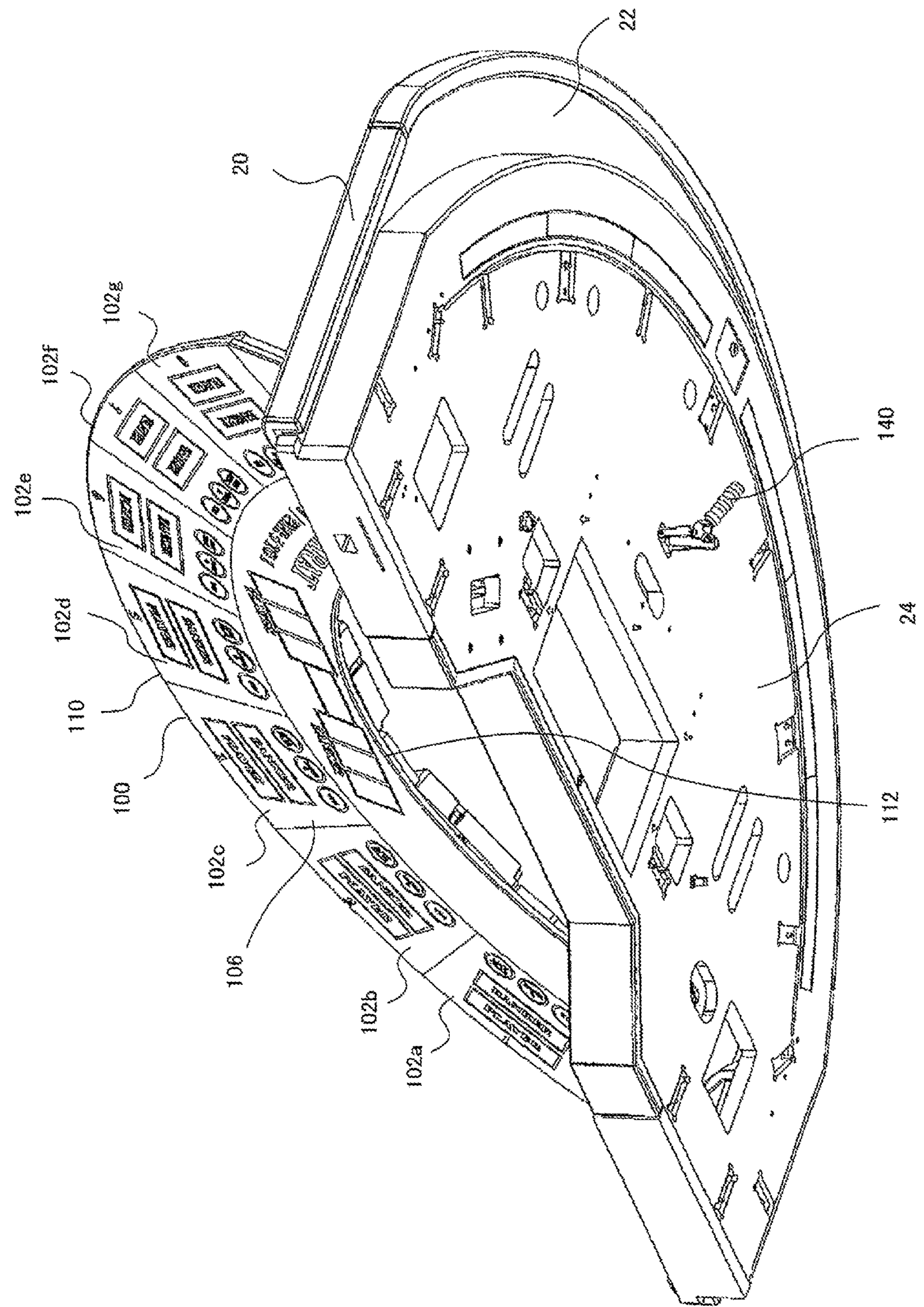
FIG. 6 is a perspective view illustrating an inside of a lower side of the top board of the game table in the state in which the game board is opened.

FIG. 1 is a perspective view of a game table (casino table) 10 according to the present embodiment, viewed from a dealer side. FIG. 2 is a perspective view of the game table 10 according to the present embodiment, viewed from a player side. FIG. 3 is a perspective view of the game table 10 in a state in which a game board is opened, viewed from the dealer side. FIG. 4 is a perspective view of the game table 10 in the state in which the game board is opened, viewed from the player side. FIG. 5 is a perspective view illustrating an inside of an upper side of a top board of the game table in the state in which the game board is opened. FIG. 6 is a perspective view illustrating an inside of a lower side of the top board of the game table in the state in which the game board is opened. It is to be noted that in FIG. 5, a chip tray 80 is omitted, and in addition, in FIG. 6, the chip tray 80 is omitted.

The game table 10 mainly has a game board 100, a top board part 20, a display 70, and a chip tray 80.

The game board 100 has a thin-plate-like and substantially fan-like shape. The fan-like shape refers to a shape enclosed by two concentric arcs, whose radiuses are different from each other, and two radiuses connecting end portions of the two arcs. As shown in FIG. 3 and FIG. 4, the game board 100 is arranged such that the game board can be opened and closed with respect to the later-described top board part 20. An opening and closing mechanism of the game board 100 will be described later. Of the two arcs, an inner periphery is a dealer side 112, and an outer periphery is a player side 110. As described above, the game board 100 has the thin-plate-like shape and has an obverse surface 106 and a reverse surface 108.

On the obverse surface 106 of the game board 100, game regions 102*a* to 102*g* for seven players and a dealer region 104 are formed. Each of the game regions 102*a* to 102*g* is a region used by each player. The dealer region 104 is a region used by a dealer. Hereinafter, in a case where it is not needed to distinguish the game regions 102*a* to 102*g*, the game regions 102*a* to 102*g* are referred to as game regions 102. A dealer is situated on the dealer side 112, and players are situated on the player side 110. A dealer and players face each other with the game table 10 sandwiched therebetween, and a variety of games such as poker, blackjack, and baccarat are caused to proceed. In accordance with the progress of a game, on the game table 10, cards such as playing cards and game chips are dealt and collected.

As shown in FIG. 4, on the reverse surface 108 of the game board 100, an antenna module 300 is provided for each of the seven game regions 102*a* to 102*g*. On the player side 110, on the reverse surface 108 of the game board 100, seven antenna modules 300 are provided along the outer periphery of the game board 100. In the dealer region 104, one antenna module 300' for the later-described reference antenna device 410 is provided. As described above, on the game board 100, a larger number of the antenna modules 300 are provided on the player side 110 than on the dealer side 112 along the outer periphery of the game board 100.

In the game regions 102, several bet regions are formed. The game regions 102 are constituted of, for example, sheets (not shown) having the bet regions printed thereon. Sizes, shapes, and numbers of the bet regions of the game regions 102 vary depending on kinds of games such as blackjack and baccarat. The sheets constituting the game regions 102 can be provided detachably on the obverse surface 106 of the game board 100.

In the antenna module 300, a plurality of antennas 304 are provided so as to correspond to the bet regions. The bet regions are determined by a kind of a game. In the antenna module 300, coupler substrates 520 are provided. The coupler substrates 520 performs transmission and reception via the antennas 304 to and from RFID IC tags of the game chips. In the game chips, chip information is stored. By the antennas 304 and the coupler substrates 520, the chip information of the game chips placed in the bet regions are read out. The antenna module 300 is communicably connected to a control part 510 and a game table control apparatus 30 (for example, a personal computer) (not shown) of the game table 10. The chip information read out by the antennas 304 is transmitted via the control part 510 to the game table control apparatus 30. A configuration and operation of the antenna module 300 will be described later.

The top board part 20 has a substantially semicircular shape. The top board part 20 has an upper stage part 22 and a lower stage part 24. The top board part 20 constitutes an upper surface of the game table 10. The top board part 20 is arranged on the game table 10 in a fixed manner. Along the substantially arc-shaped outer periphery of the top board part 20, seven players can be situated. On a front side of the chip tray 80 placed on the top board part 20, a dealer is situated.

The upper stage part 22 mainly has regions where game chips and cards held by players are placed and a region where the chip tray used by a dealer is placed. On the upper stage part 22, an opening part 26 (refer to FIG. 4) corresponding to a size and a shape of the game board 100 is formed.

The lower stage part 24 is arranged below the upper stage part 22. The lower stage part 24 mainly has hinge parts 120 and six game board supporting parts 28 (refer to FIG. 4 and FIG. 5). The hinge parts 120 support the game board 100 so as to allow the game board 100 to be opened and closed. When the game board 100 is closed, the game board 100 is housed in the opening part 26, and the game board supporting parts 28 come in contact with the reverse surface 108 of the game board 100 and support the game board 100. By the hinge parts 120 and the game board supporting parts 28, a state in which the game board 100 is housed is maintained. The state in which the game board 100 is housed in the opening part 26 is a normal state in which games are conducted on the game table 10.

Figure 9:
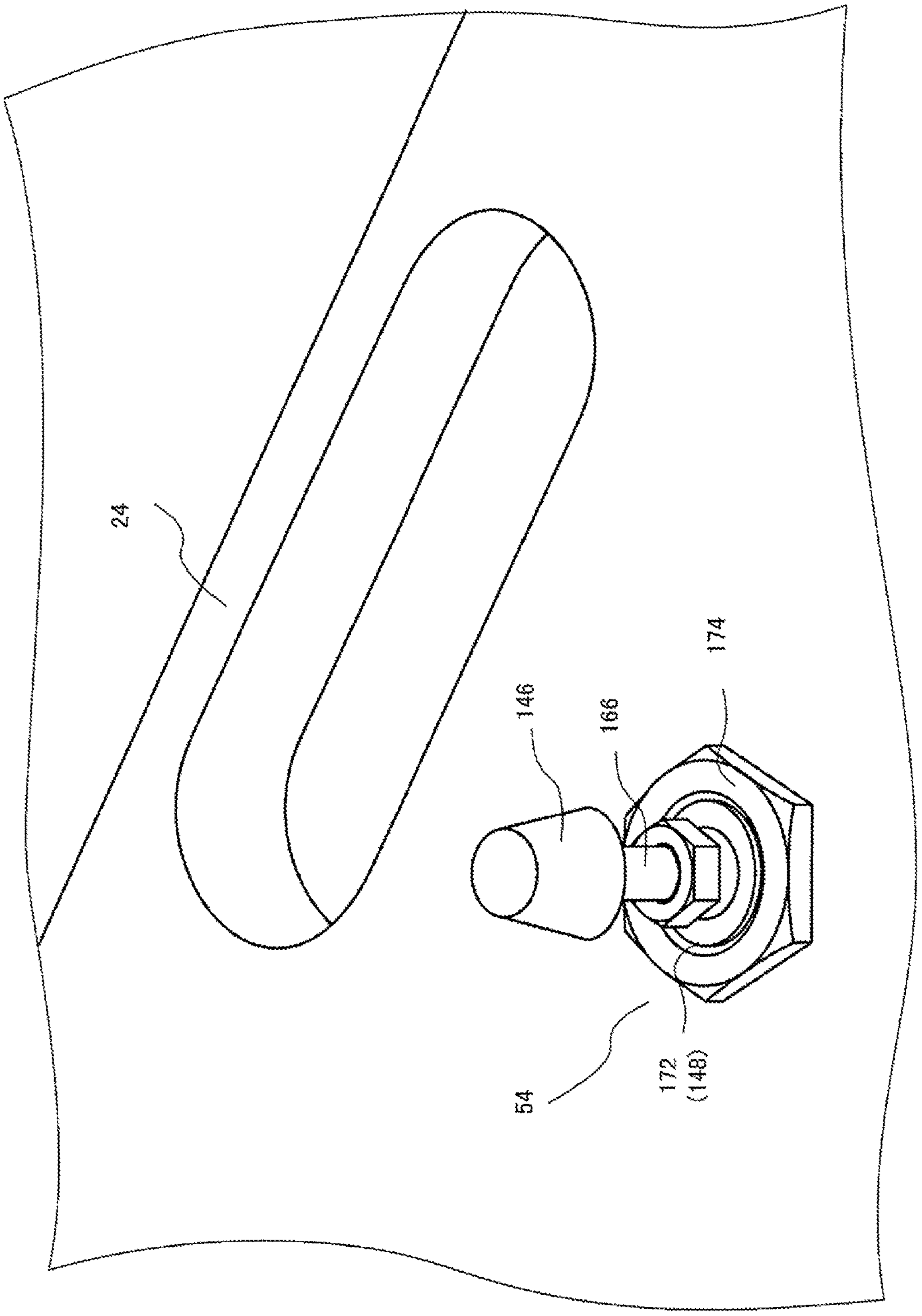
FIG. 9 is a perspective view illustrating a state in which a tip part 146 of the opening auxiliary mechanism 140 has protruded from the lower stage part 24.

In the lower stage part 24, a tip part 146 of an opening auxiliary mechanism 140 is arranged (refer to FIG. 9). It is to be noted that the opening auxiliary mechanism 140 will be described later.

On the dealer side 112 of the upper stage part 22, three kinds of antenna devices which are an erasure antenna device 400, a reference antenna device 410, and a registration antenna device 420 are provided. The erasure antenna device 400 is provided on the left side of the chip tray 80, the reference antenna device 410 is provided on the depth side of the chip tray 80 (on the player side 110), and the registration antenna device 420 is provided on the right side of the chip tray 80. In front of the chip tray 80, a dealer is situated. The three kinds of antenna devices, which are the erasure antenna device 400, the reference antenna device 410, and the registration antenna device 420 are arranged so as to surround the chip tray 80 (a dealer).

The erasure antenna device 400 is an antenna for erasing information pertinent to players, for example, player identification information for identifying players. The registration antenna device 420 is an antenna for registering the player identification information.

In each of the game chips, a variety of pieces of chip information such as chip identification information for identifying each of the game chips are previously stored in an RFID IC tag (not shown). On the game table 10, a game table control apparatus 30 (refer to FIG. 24) is mounted. The game table control apparatus 30 is communicably connected via a network 40 to a server 600 which is installed in a game facility. Besides the server 600, connected to the game table control apparatus 30 are the erasure antenna device 400, the reference antenna device 410, the registration antenna device 420, the antenna modules 300, and a variety of other sensors.

The erasure and the registration of the player identification information are performed via the game table control apparatus 30 of the game table 10 on the server 600 in a game facility. The server 600 manages the game chips used in a game facility. On the server 600, the chip identification information for identifying the game chips and the player identification information are stored as a database (the later-described database part 610) so as to be associated with each other. Based on a variety of pieces of information transmitted from the game table control apparatus 30, the server 600 updates at any time a correspondence relationship between the chip identification information and the player identification information.

The erasure of the player identification information is performed as follows. First, the chip identification information is read out from each of the game chips by the erasure antenna device 400. The game table control apparatus 30 of the game table 10 transmits the read-out chip identification information to the server 600. The server 600 deletes player identification information associated with the received chip identification information from the database. Thus, the correspondence relationship (association) between the chip identification information and the player identification information is released, that game chip is invalidated, and that game chip is set in a state in which that game chip has been returned from that player to a game facility.

The registration of the player identification information is performed as follows. First, the chip identification information is read out from each of the game chips by the registration antenna device 420. The game table control apparatus 30 of the game table 10 transmits the read-out chip identification information and player identification information associated with that game chip to the server 600. The server 600 receives the chip identification information and the player identification information and stores in the database the chip identification information and the player identification information so as to be associated with each other. Thus, a correspondence relationship (association) between the chip identification information and the player identification information is formed, that game chip is validated, and that game chip is set in a state in which that game chip has been lent from a game facility to a player.

The reference antenna device 410 is an antenna used by a dealer for confirming the game chips. When a dealer deals game chips to players, a dealer takes out the game chips from the chip tray 80, and then, a dealer is required to deal to players the game chips which have been subjected to the registration processing. At this time, before dealing the game chips to players, a dealer can confirm by the reference antenna device 410 whether or not the game chips have been subjected to the registration processing.

In addition, when a dealer collects the game chips from players, a dealer is required to house into the chip tray 80 the game chips which have been subjected to the erasure processing. At this time, before housing the game chips into the chip tray 80, a dealer can confirm by the reference antenna device 410 whether or not the game chips have been subjected to the erasure processing.

Ways of the confirmation of the game chips vary, depending on whether not only the chip identification information but also validation/invalidation information are stored in each of the game chips. First, in a case where the validation/invalidation information is also stored in each of the game chips, both pieces of information of the chip identification information and the validation/invalidation information are read out by the reference antenna device 410. The game table control apparatus 30 displays the read-out chip identification information and validation/invalidation information on the display 70. By visually recognizing the chip identification information and validation/invalidation information displayed on the display 70, a dealer can confirm contents and a state of that game chip. In the case where the validation/invalidation information is also stored in each of the game chips, without communicating with the server 600, the validation/invalidation information can be displayed on the display 70.

In addition, in a case where the validation/invalidation information is not stored in each of the game chips, it is required to previously store the validation/invalidation information on the server 600 (refer to the later-described FIG. 25 and FIG. 26) and to obtain the validation/invalidation information through the communication with the server 600.

In this case, first, the chip identification information is read out from each of the game chips by the reference antenna device 410. Next, the game table control apparatus 30 of the game table 10 transmits the read-out chip identification information to the server 600. The server 600 receives the chip identification information, reads out chip information stored as a record 800 (refer to FIG. 26) in the database part 610, and transmits the chip information to the game table control apparatus 30. The game table control apparatus 30 displays the chip information on the display 70. By visually recognizing the chip information displayed on the display 70, a dealer can confirm contents and a state of that game chip.

Further, the game table control apparatus 30 can display not only the chip information transmitted from the server 600 on the display 70 but also based on the chip information, a number of game chips to be dealt to players, a number of game chips collected from players, and amounts thereof on the display 70.

On a right end portion on the dealer side of the game table 10, the display 70 is provided so as to allow a dealer to perform the visual recognition. Connected to the display 70 is the game table control apparatus 30 or the like of the game table 10. By the game table control apparatus 30, a variety of pieces of information such as the identification information of players, the validation/invalidation information, other information pertinent to the game chips, and information pertinent to games are displayed on the display 70.

The chip tray 80 is provided in front of the dealer side 112. The chip tray 80 is configured to be detachable with respect to the game table 10. In the chip tray 80, game chips to be dealt to players and game chips collected from players are housed. When a dealer leaves the game table 10, a dealer detaches the chip tray 80 and carries the whole chip tray 80 with him or her. The game chips housed in the chip tray 80 are managed by a game facility such as a dealer.

In a position on the depth side of the chip tray 80 and right in front of a dealer, a display 75 is provided. On the display 75, information pertinent to the game chips such as the information of the game chips read out by the reference antenna device 410 is displayed. For example, the chip identification information of each of the game chips read out by the reference antenna device 410, the validation/invalidation information of that game chip, and the like are displayed on the display 75. It is to be noted that information of the game chips which is read out by not only the reference antenna device 410 but also the erasure antenna device 400 and the registration antenna device 420 may be displayed on the display 75.

On a left side of a dealer situated at the game table 10, a chip stocker 90 is arranged. In other words, the chip stocker 90 is located in the vicinity of the erasure antenna device 400. On the bottom surface of the chip stocker 90, four casters are provided. The chip stocker 90 is placed so as to be movable with respect to the game table 10. In the chip stocker 90, game chips used by a dealer are housed. It is to be noted that as described later, all of the game chips housed in the chip stocker 90 have been invalidated.

In a position in a lower portion of the game table 10 on the right side of a dealer, which players hardly visually recognize, a cashbox 95 is arranged. In other words, the cashbox 95 is located in the vicinity of the registration antenna device 420. The cashbox 95 can be opened by a predetermined key. In the cashbox 95, cash used by a dealer can be kept. The cash kept in the cashbox 95 is cash received from players and cash to be handed over to players as change.

In the cashbox 95, a device (not shown) for determining authenticity of bills is provided. Before keeping bills in the cashbox 95, authenticity of bills received from players can be determined. The cashbox 95 is provided in the game table 10, thereby allowing players to exchange cash for game chips without going to a cashier and to continue games on the game table 10.

In a lower portion of a front face of the dealer side of the game table 10, a key hole 32 is provided. A predetermined key is inserted into the key hole 32 and is operated, thereby allowing a panel of the lower portion to be detached. By detaching the panel of the lower portion, an operation lever 144 can be set in an operable state. The operation lever 144 will be described later.

As described above, the three kinds of antenna devices, which are the erasure antenna device 400, the reference antenna device 410, and the registration antenna device 420 are arranged so as to surround the chip tray 80 (a dealer). Specifically, the erasure antenna device 400 and the registration antenna device 420 are located in positions which are remote from each other, with the chip tray 80 (a dealer) sandwiched therebetween. Since the erasure antenna device 400 and the registration antenna device 420 are separately arranged so as to be remote from each other, with the chip tray 80 sandwiched therebetween, the erasure antenna device 400 and the registration antenna device 420 can be clearly distinguished, thereby allowing mistakes in the invalidation processing and validation processing of the game chips caused by a dealer in confusion to be prevented and enabling the occurrence of a human error to be reduced.

In the present embodiment, both of the erasure antenna device 400 and the registration antenna device 420 have circular shapes. The shapes and colors thereof may be made different from each other. The shapes and colors thereof are made different from each other, thereby allowing a dealer to visually recognize the difference between the erasure antenna device 400 and the registration antenna device 420 and enabling erroneous recognition by a dealer to be prevented.

The reference antenna device 410 is located on the depth side of the chip tray 80 (a dealer) and in front of the player side 110. The reference antenna device 410 can be clearly distinguished from the erasure antenna device 400 and the registration antenna device 420, thereby allowing confusion of a dealer to be prevented. In addition, since the reference antenna device 410 is located in the closest position to players, a dealer can make confirmation of the reference antenna device 410 before dealing the game chips to players and when a dealer receives the game chips from players, thereby allowing a dealer's work to be simplified.

Further, the reference antenna device 410 is located on the depth side from the display 75 and so as to be adjacent to the display 75. It is made easy to visually compare actually placed game chips on the reference antenna device 410 and information of the game chips displayed on the display 75, thereby allowing confirmation work by a dealer to be facilitated and simplified.

In addition, the reference antenna device 410 is located so as to be adjacent to the game regions where media such as cards are placed. Thus, the game chips can be placed in the regions where both of a dealer and players pay the highest attention, thereby allowing the both of a dealer and players to mutually confirm the game chips.

Furthermore, an operation switch (not shown) for setting the reference antenna device 410 in an operating state may be provided for the game table 10. The operation switch can be operated by a dealer. When the operation switch is turned on, the reference antenna device 410 comes to be in an operating state, and when the operation switch is turned off, the reference antenna device 410 comes to be in a non-operating state. In a case where the reference antenna device 410 is located close to the antennas 304 of the antenna module 300 arranged in the bet regions, interference is likely to be caused by these antennas and the reference antenna device 410. If the interference has occurred, because in order to improve reading accuracy of the antennas 304 of the antenna module 300, repeated reading is required, the operation becomes slow, and delay in the progression of games may be caused.

Therefore, normally, a dealer turns the operation switch off and sets the reference antenna device 410 in the non-operating state, and only when a dealer needs the reference antenna device 410, a dealer turns the operation switch on and sets the reference antenna device 410 in the operating state. Thus, influence exerted on the progression of games by the reference antenna device 410 can be prevented.

In addition, the erasure antenna device 400 is located on a side of the chip stocker 90 (on the left side of a dealer). It is made easy to house invalidated game chips in not only the chip tray 80 but also the chip stocker 90, thereby allowing timing, at which the invalidated game chips are fraudulently taken out, to be reduced.

Along the periphery of the top board part 20, a marginal part 60 is formed. The marginal part 60 has a long shape along the periphery of the top board part 20, the shape upwardly protruding. Inside of the marginal part 60, LED substrates (not shown) are provided along a longitudinal direction of the marginal part 60. The LED substrates are connected to a power source (not shown), emitting blue light.

On a side of the marginal part 60, which faces the dealer side, an opening 62 is formed along the longitudinal direction of the marginal part 60. On the opening 62, a light transmitting plate formed of acrylic or the like is provided along the opening 62. The blue light emitted from the LED substrates travels through the light transmitting plate toward the upper stage part 22. The light emitted from the LED substrates can illuminate the upper stage part 22. Thus, without depending on brightness and darkness of illumination in a game facility, game chips, playing cards, and the like placed on the upper stage part 22 of the game board 100 can be illuminated.

The game table 10 has the opening auxiliary mechanism 140 for opening the game board 100 and the opening and closing braking mechanism 180. As described above, since the game board 100 is large and heavy, it is easily made difficult to open and lift up the game board 100. Therefore, the opening auxiliary mechanism 140 and the opening and closing braking mechanism 180 are arranged for the game table 10, thereby facilitating work.

Figure 7:
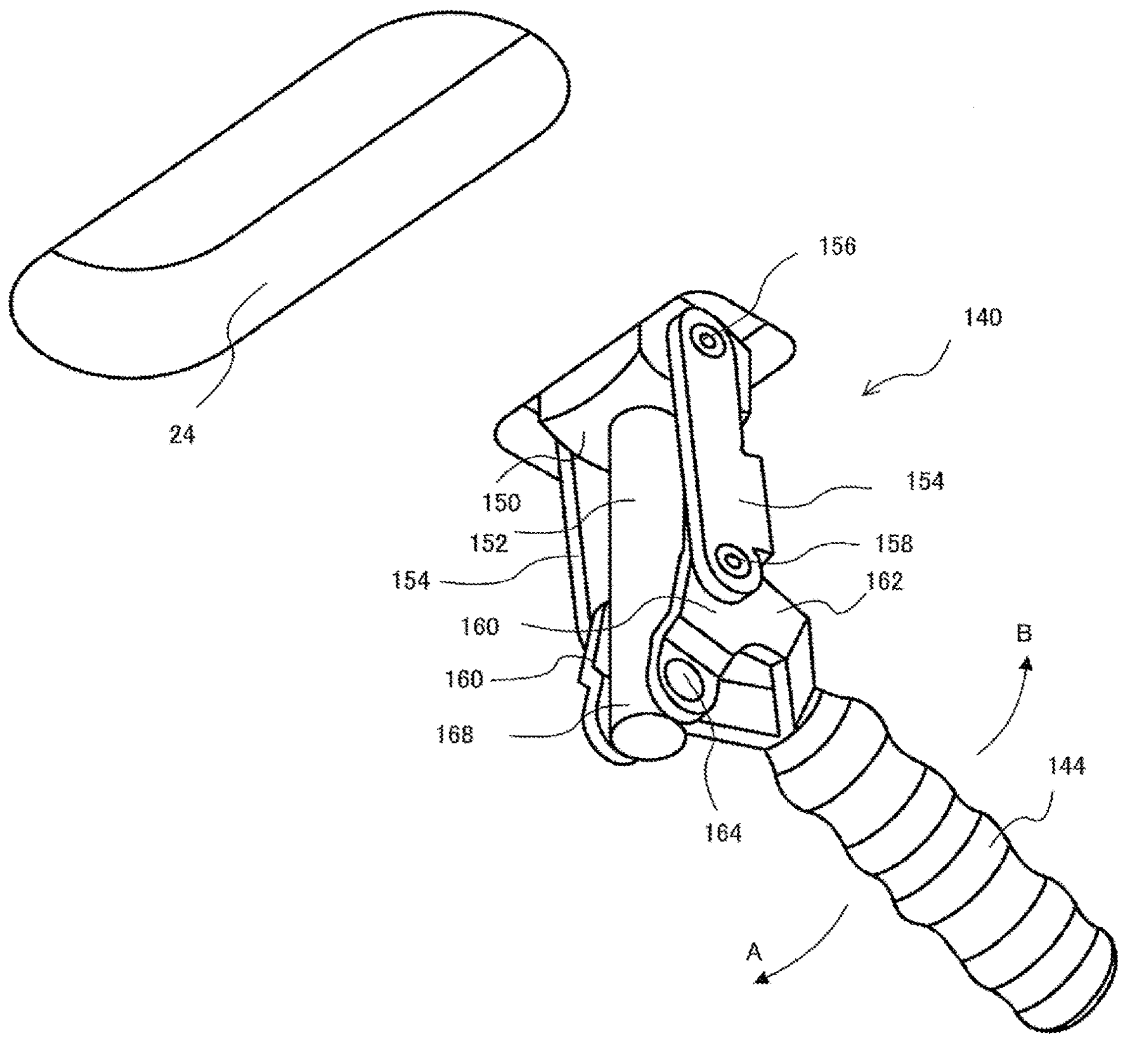
FIG. 7 is a perspective view illustrating an opening auxiliary mechanism 140, viewed from below a lower stage part 24.
Figure 8:
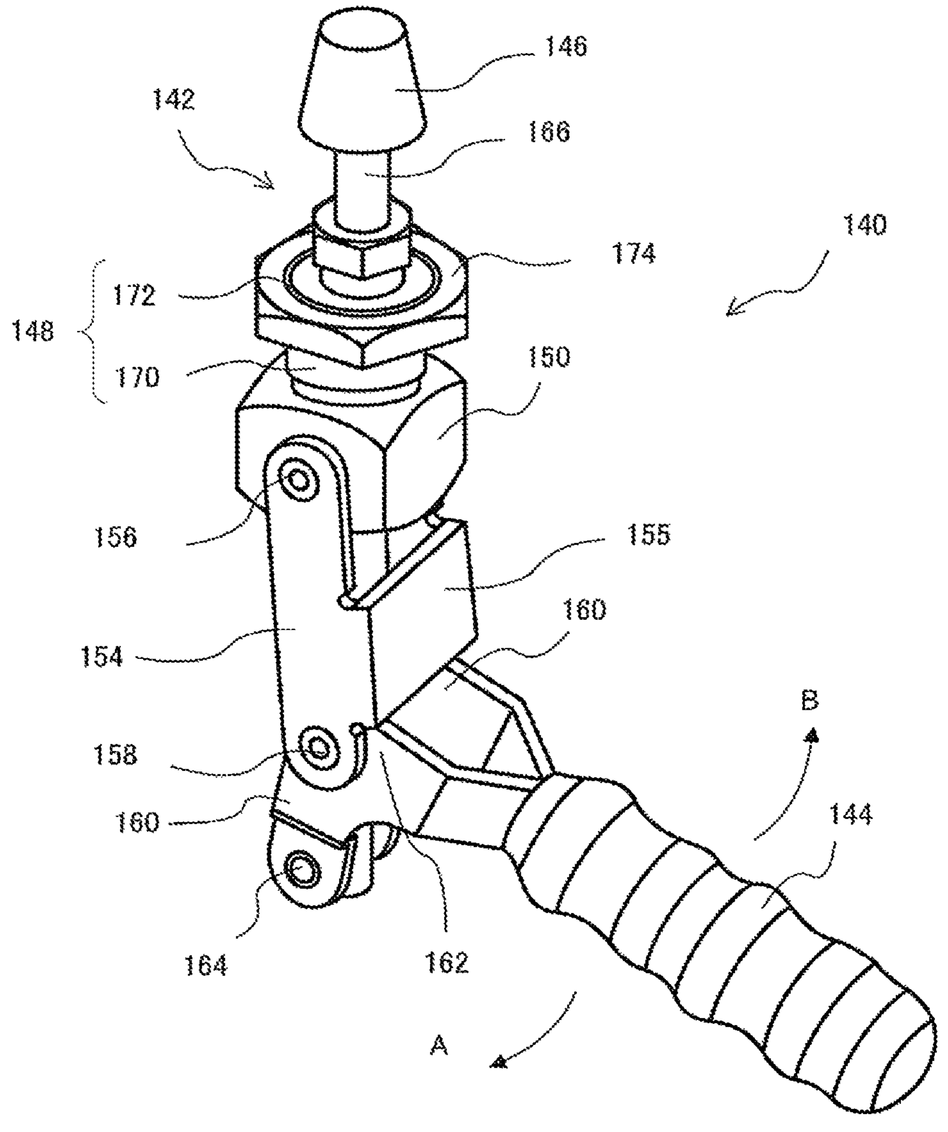
FIG. 8 is a perspective view illustrating the whole of the opening auxiliary mechanism 140.

As shown in FIG. 7 and FIG. 8, the opening auxiliary mechanism 140 mainly has a reciprocating movable part 142 operable to perform a reciprocating motion and the operation lever 144 for operating the reciprocating movable part 142.

The reciprocating movable part 142 has the tip part 146, a fixing part 148, a main body part 150, and a straight advancing part 152. The fixing part 148 has a holding part 170 and a screw forming part 172. The holding part 170 is inserted into the later-described through hole 52 of the top board part 20 and is retained. On the screw forming part 172, a screw thread is formed so as to revolve therearound. A nut 174 is detachably attached onto the screw thread. As described later, the nut 174 is attached onto the screw forming part 172, and the reciprocating movable part 142 is fixed on the lower stage part 24 of the top board part 20. The main body part 150 and the fixing part 148 are integrally formed and support the straight advancing part 152 so as to allow the straight advancing part 152 to perform the reciprocating motion. The tip part 146 is provided at the first end part 166 of the straight advancing part 152. In this way, the tip part 146 moves together with the straight advancing part 152 with respect to the fixing part 148 and the main body part 150.

The tip part 146 has an elastic body formed of rubber, resin, or the like. The tip part 146 is operable to come in contact with the reverse surface 108 of the game board 100.

In the main body part 150, a through hole (not shown) is formed. Inserted into the through hole is the straight advancing part 152. By the through hole of the main body part 150, the straight advancing part 152 is guided and moves in a linear manner. In this way, the straight advancing part 152 is supported by the fixing part 148 and the main body part 150 so as to be operable to perform the reciprocating motion.

The straight advancing part 152 is operable to reciprocate and move in the linear manner with respect to the fixing part 148 and the main body part 150, that is, to move in an upward direction or a downward direction. When the straight advancing part 152 moves in the upward direction, the tip part 146 moves in a direction in which the tip part 146 is protruded from the lower stage part 24. On the other hand, when the straight advancing part 152 moves in the downward direction, the tip part 146 moves in a direction in which the tip part 146 is housed in the lower stage part 24.

As shown in FIG. 7, the opening auxiliary mechanism 140 has two first coupling bodies 154. First end parts 156 of the first coupling bodies 154 are rotatably coupled to the main body part 150. Second end parts 158 of the first coupling bodies 154 are rotatably coupled to first end parts 162 of the second coupling bodies 160, which are formed in the operation lever 144. Second end parts 164 of the operation lever 144 are rotatably provided in a second end part 168 of the straight advancing part 152. As shown in FIG. 8, a coupling part 155 for mutually coupling the two first coupling bodies 154 is formed.

Figure 10:
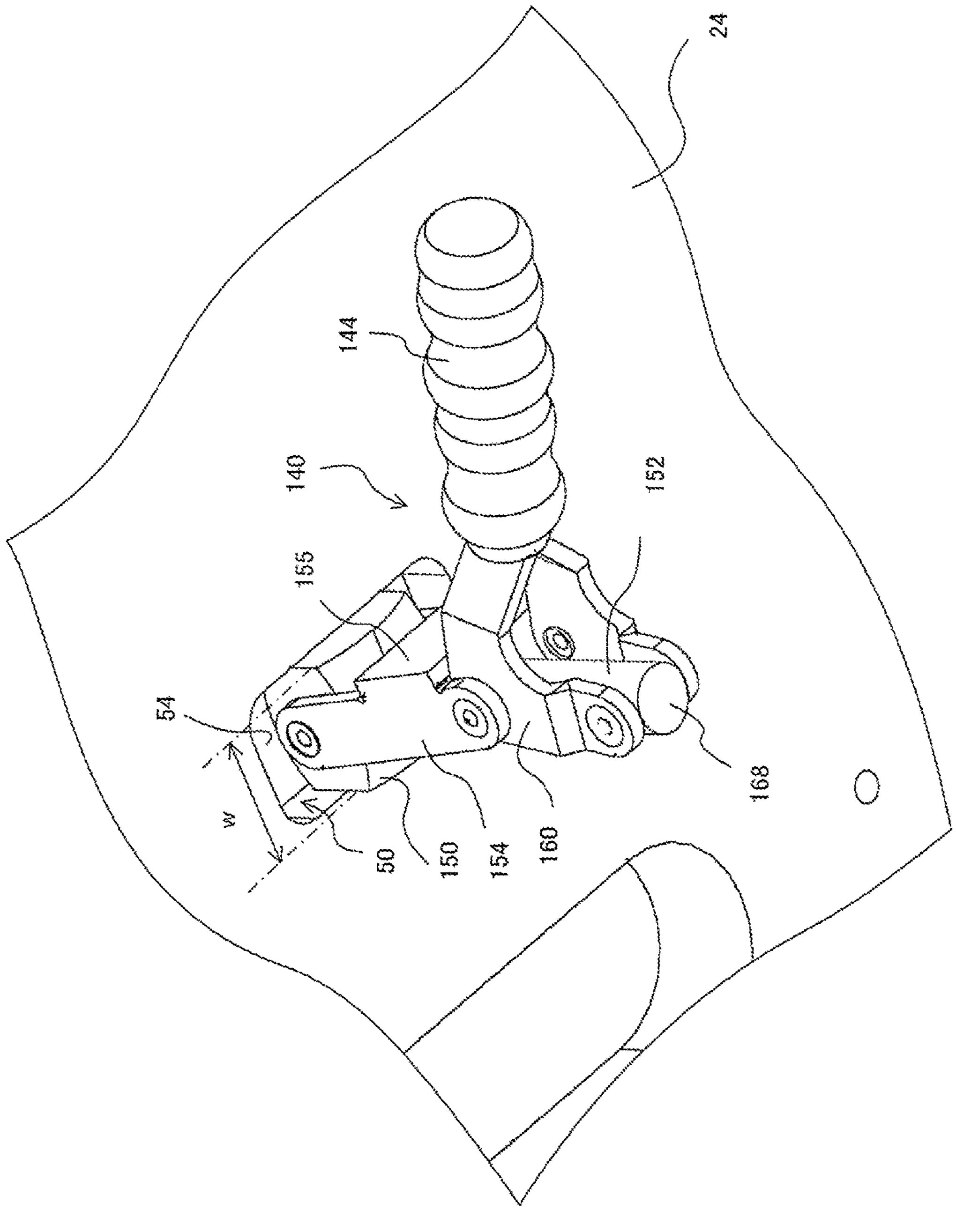
FIG. 10 is a perspective view illustrating a state in which the opening auxiliary mechanism 140 is fixed onto the lower stage part 24 of a top board part 20.
Figure 11:
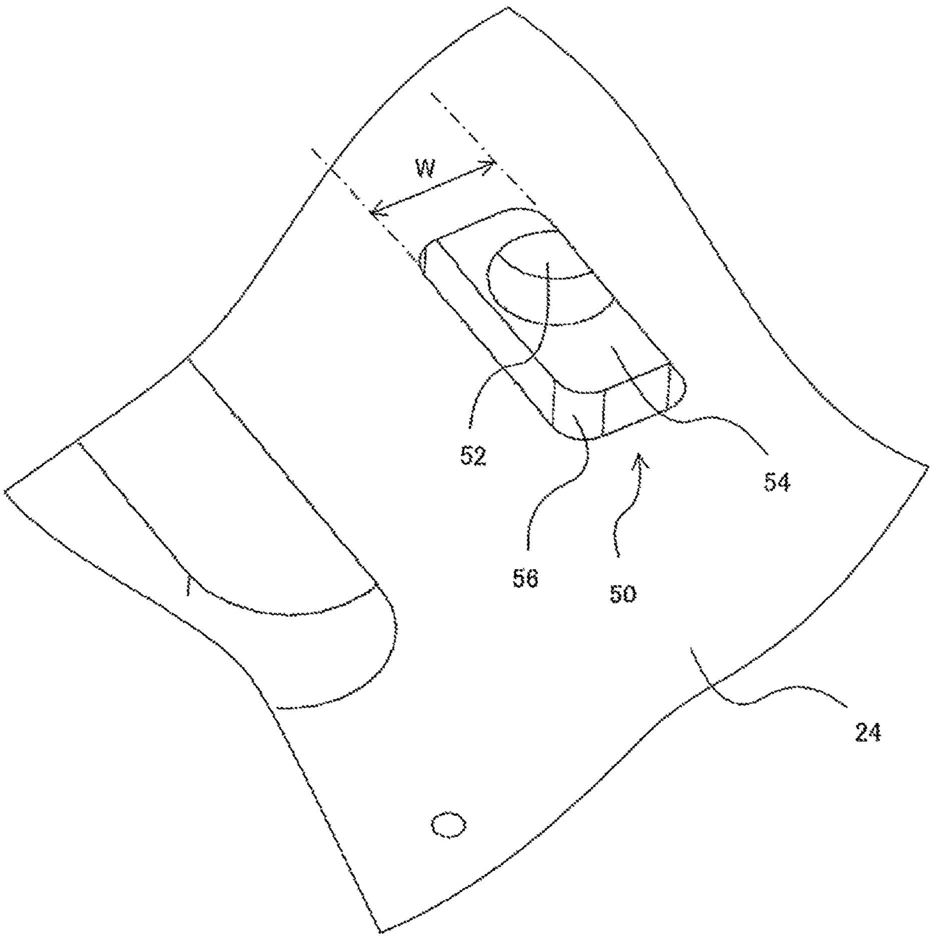
FIG. 11 is a perspective view illustrating the lower stage part 24 of the top board part 20, viewed from a reverse surface side (lower surface side).

FIG. 10 is a perspective view illustrating a state in which the opening auxiliary mechanism 140 is fixed onto the lower stage part 24 of the top board part 20. FIG. 11 is a perspective view illustrating the lower stage part 24 of the top board part 20, viewed from a reverse surface side (lower surface side).

As shown in FIG. 11, in the lower stage part 24 of the top board part 20, a recess part 50 for attaching the opening auxiliary mechanism 140 is formed. The recess part 50 is constituted of the through hole 52, a supporting part 54, and a housing part 56. The through hole 52 has a substantially cylindrical shape, and inserted thereinto is the holding part 170 of the opening auxiliary mechanism 140. The supporting part 54 is formed so as to have a thickness thinner than that of the top board part 20. The housing part 56 has a substantially rectangular parallelepiped shape.

As shown in FIG. 10 the main body part 150 is housed in the housing part 56. A width w (FIG. 10) of the main body part 150 is formed so as to be slightly smaller than a width W (FIG. 11) of the housing part 56. Therefore, by housing the main body part 150 in the housing part 56, rotation of the main body part 150 is restrained and the main body part 150 can be retained. Thus, the opening auxiliary mechanism 140 can be attached onto the top board part 20 so as to avoid the rotation of the whole of the opening auxiliary mechanism 140 with respect to the top board part 20. In addition, as shown in FIG. 9 and FIG. 10, the main body part 150 and the nut 174 are arranged so as to sandwich the supporting part 54 therebetween, and the opening auxiliary mechanism 140 is detachably attached onto the lower stage part 24. In this way, by attaching the nut 174 onto the fixing part 148, the opening auxiliary mechanism 140 can be attached onto the top board part 20 so as to avoid the rotation of the opening auxiliary mechanism 140.

A tilting operation of the operation lever 144 can be performed by an operator such as a store employee. As described above, by detaching the panel in the lower portion, the operation lever 144 can be set in the operable state, thereby allowing an operator such as a store employee to operate the operation lever 144.

Figure 12:
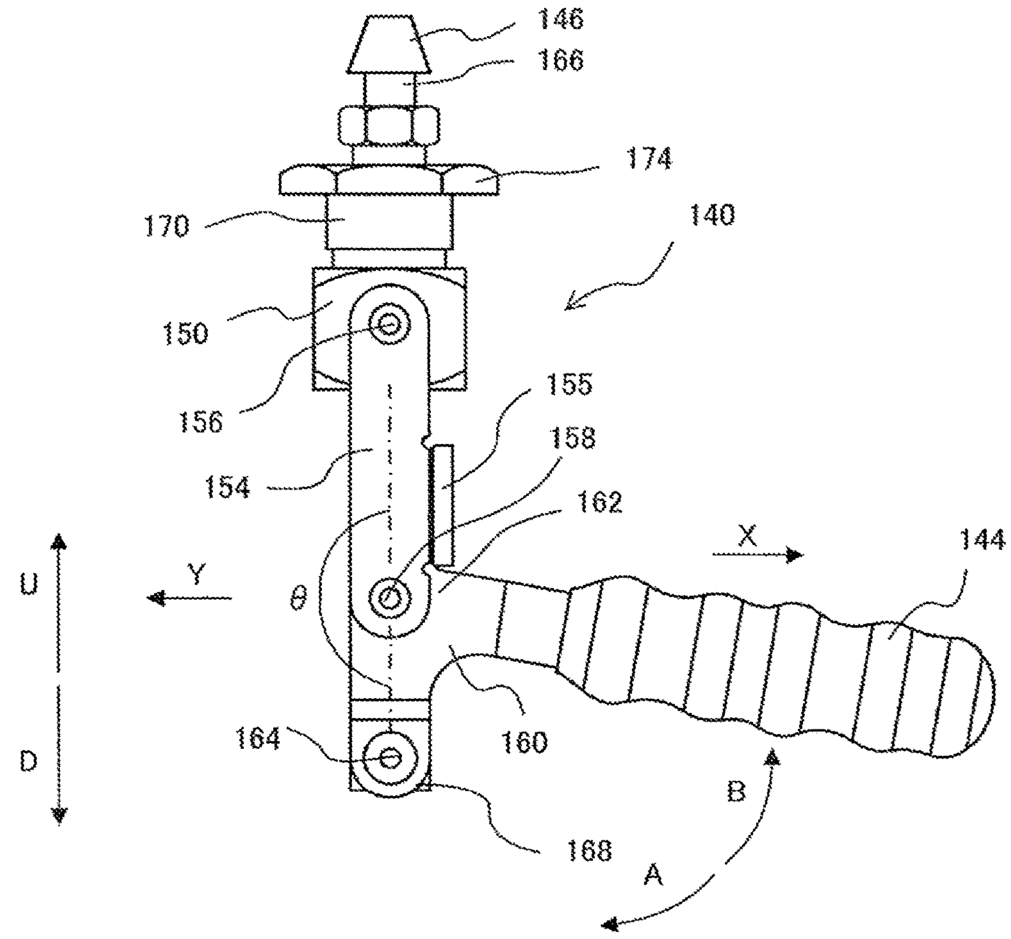
FIG. 12 is a side view illustrating a state in which the opening auxiliary mechanism 140 is operated by an operation lever 144.
Figure 13:
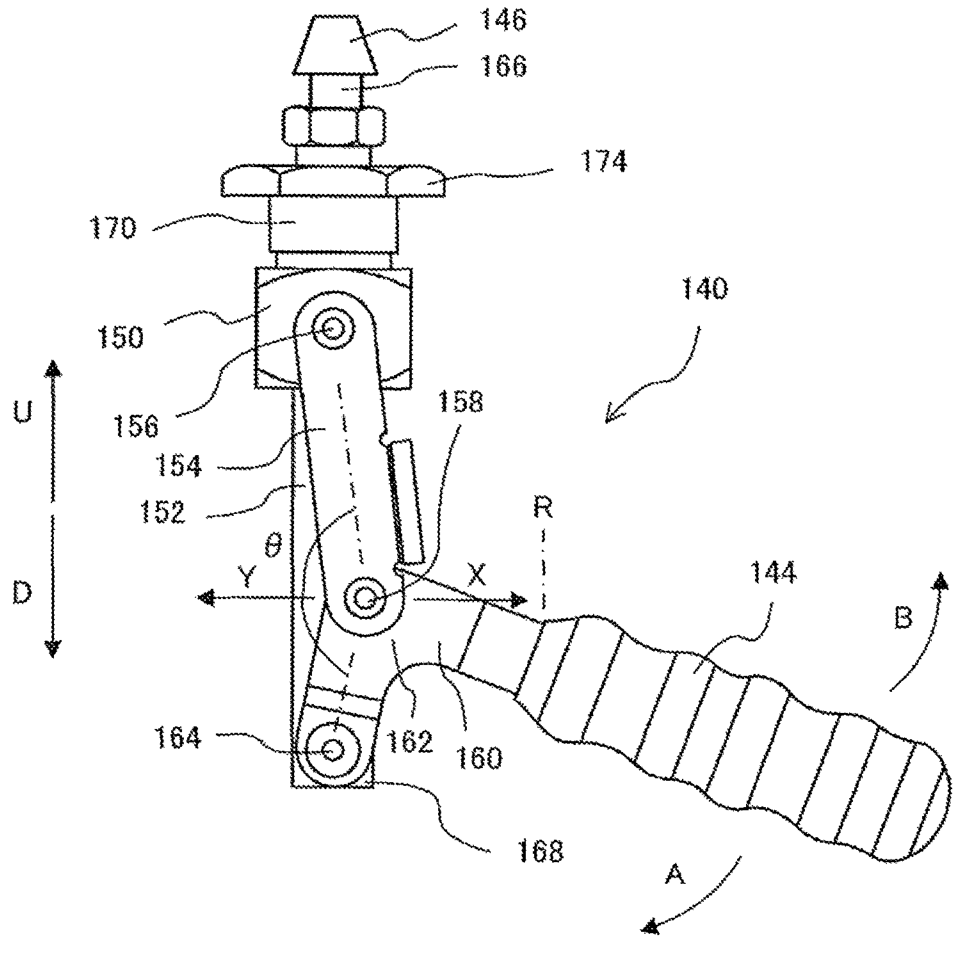
FIG. 13 is a side view illustrating a state in which the opening auxiliary mechanism 140 is operated by the operation lever 144.
Figure 14:
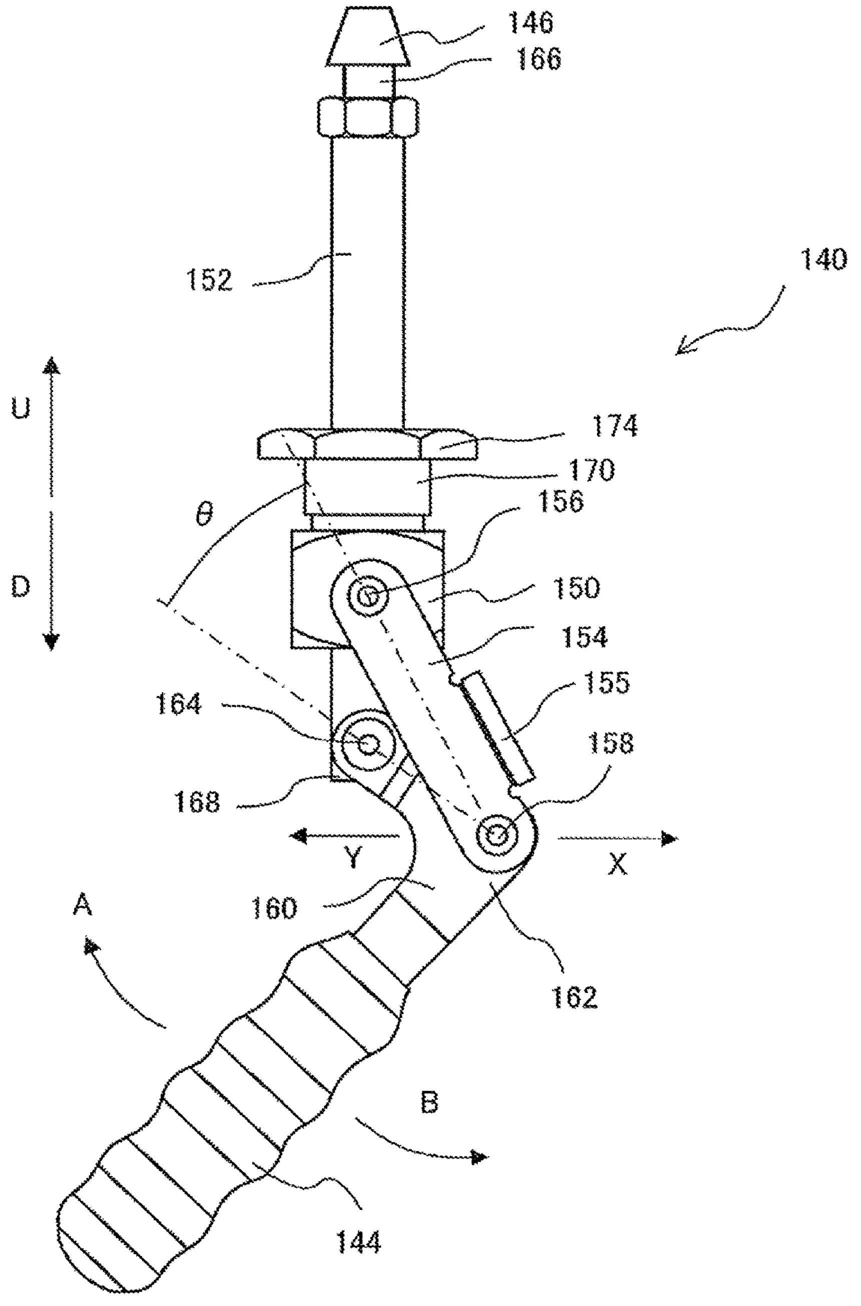
FIG. 14 is a side view illustrating a state in which the opening auxiliary mechanism 140 is operated by the operation lever 144.
Figure 15:
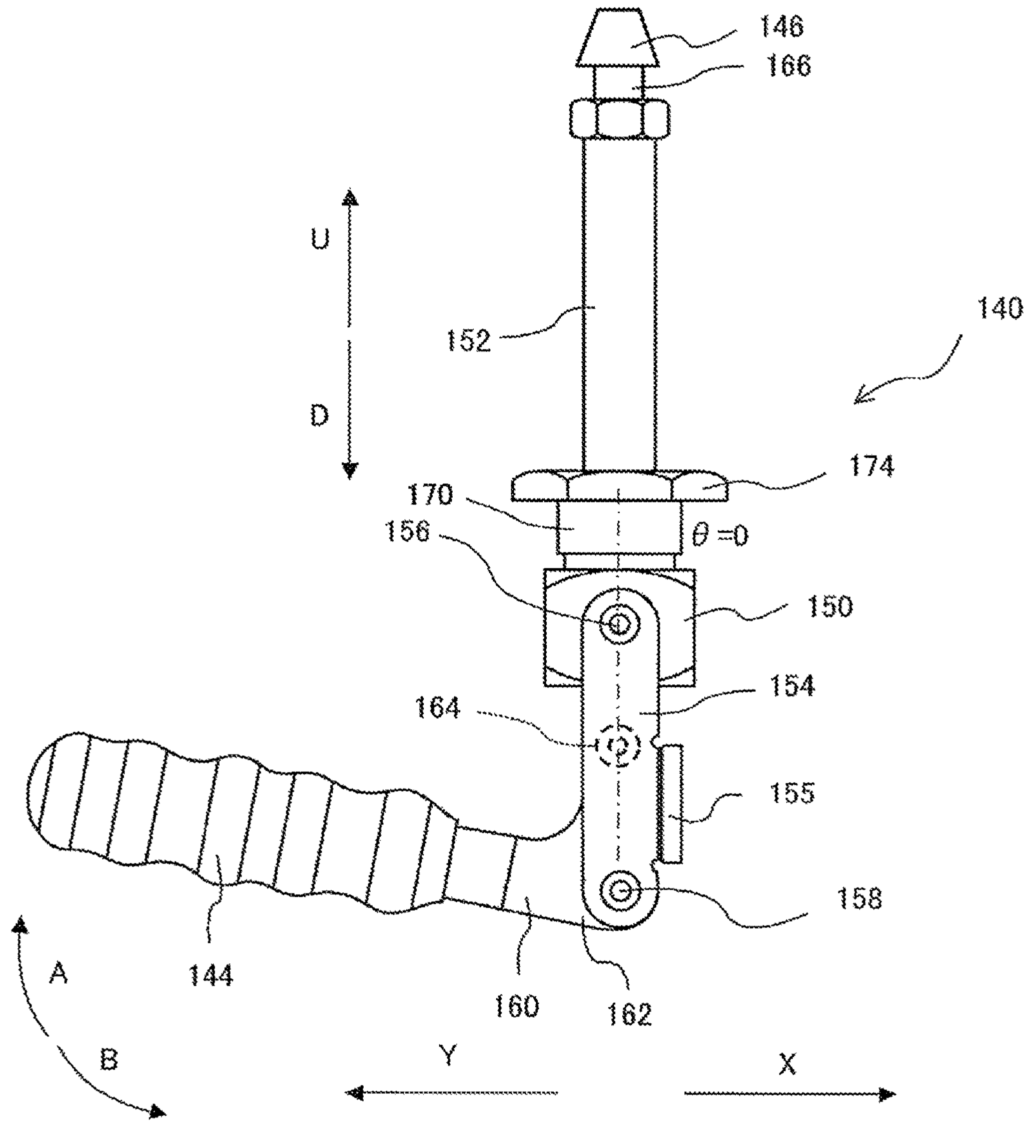
FIG. 15 is a side view illustrating a state in which the opening auxiliary mechanism 140 is operated by the operation lever 144.

Each of FIG. 12 to FIG. 15 is a diagram illustrating an operation of the operation lever 144 and motions of the tip part 146. FIG. 12 is a diagram illustrating a state in which the tip part 146 is housed to the maximum extent. By gradually rotating the operation lever 144, the tip part 146 gradually moved in the upward direction (FIG. 13 and FIG. 14). FIG. 15 is a diagram illustrating a state in which the tip part 146 is protruded to the maximum extent.

When in the state shown in FIG. 12, the operation lever 144 is tilted in a direction indicated by an arrow A, as shown in FIG. 13, the second end parts 158 of the first coupling bodies 154 and the first end part 162 of the operation lever 144 gradually move in a direction indicated by an arrow X. This gradually decreases an angle θ (refer to FIG. 13) formed between each of the first coupling bodies 154 and each of the second coupling bodies 160, and the second end parts 164 of the operation lever 144 move in an upward direction (indicated by an arrow U). This moves the tip part 146 together with the straight advancing part 152 in the upward direction (indicated by the arrow U). Thereafter, by further tilting the operation lever 144 in the direction indicated by the arrow A, the second end parts 158 of the first coupling bodies 154 and the first end part 162 of the operation lever 144 once move up to a rightmost end R (FIG. 13) and thereafter, gradually move in a direction indicated by an arrow Y opposite to the direction indicated by the arrow X.

As shown in FIG. 14, upon further tilting the operation lever 144 in the direction indicated by the arrow A, the second end parts 158 of the first coupling bodies 154 and the first end part 162 of the operation lever 144 further move in the direction indicated by the arrow Y. In conjunction therewith, the angle θ (refer to FIG. 14) formed between each of the first coupling bodies 154 and each of the second coupling bodies 160 further decreases, the second end parts 164 (straight advancing part 152) of the operation lever 144 further move in the upward direction (indicated by the arrow U), and the tip part 146 moves in the upward direction (indicated by the arrow U).

As shown in FIG. 15, by further tilting the operation lever 144 in the direction indicated by the arrow A, the angle θ (refer to FIG. 15) formed between each of the first coupling bodies 154 and each of the second coupling bodies 160 can be decreased to zero. At this time, the second end parts 164 (straight advancing part 152) of the operation lever 144 move to a position where the second end parts 164 are located at the highest, and the tip part 146 moves to a position where the tip part 146 is protruded to the maximum extent. Since the angle θ formed between each of the first coupling bodies 154 and each of the second coupling bodies 160 is zero, each of the first coupling bodies 154 and each of the second coupling bodies 160 are aligned in a straight line. It is to be noted that in FIG. 15, the second end part 164 of the operation lever 144 is shown by a broken line as a hidden line.

Specifically, three points of each of the first end parts 156 of the first coupling bodies 154, each of the second end parts 158 of the first coupling bodies 154, and each of the second end parts 164 of the operation lever 144 are aligned in a straight line. Between each of the first end parts 156 of the first coupling bodies 154 and each of the second end parts 158 of the first coupling bodies 154, each of the second end parts 164 of the operation lever 144 is located, and the second end parts 158 of the first coupling bodies 154 move to positions where the second end parts 158 are located in the lowest positions. In this way, by locating the second end parts 158 of the first coupling bodies 154 in the lowest positions, this state can be stabilized. Accordingly, the state in which the tip part 146 is protruded is stably maintained, and the opening auxiliary mechanism 140 can be set in a locked state.

Further, in this case, since the coupling part 155 coupling the two first coupling bodies 154 are in contact with the second coupling bodies 160, the state in which the tip part 146 is protruded is more stabilized.

As described above, upon tilting the operation lever 144 in the direction indicated by the arrow A (refer to FIG. 12 to FIG. 15), the tip part 146 moves together with the straight advancing part 152 in the direction in which the tip part 146 is protruded from the lower stage part 24. This jacks up the game board 100 in contact with the tip part 146 in an upward direction. The game board 100 is jacked up in the upward direction, thereby forming a space (not shown) between the game board 100 and the upper stage part 22. An operator such as a store employee puts his or her hand into the formed space, manually moves the game board 100 in the upward direction, and can thereby open the game board 100.

On the other hand, upon tilting the operation lever 144 in a direction indicated by an arrow B (refer to FIG. 7, FIG. 8, and FIG. 12 to FIG. 15), each of the second end parts 158 of the first coupling bodies 154 and each of the first end parts 162 of the operation lever 144 once move in the direction indicated by the arrow X, move up to the rightmost end R (FIG. 13), and thereafter, move in the direction indicated by the arrow Y opposite to the direction indicated by the arrow X. This gradually increases the angle θ formed between each of the first coupling bodies 154 and each of the second coupling bodies 160, and the second end parts 164 of the operation lever 144 move in a downward direction (indicated by an arrow D). The second end parts 164 of the operation lever 144 are rotatably arranged in the second end part 168 of the straight advancing part 152. Accordingly, in conjunction with the movement of the second end parts 164 of the operation lever 144 in the downward direction so as to be away from the fixing part 148, the straight advancing part 152 also moves the downward direction (indicated by the arrow D), and the tip part 146 can be moved up to the lowest point (FIG. 12).

As described above, upon tilting the operation lever 144 in the direction indicated by the arrow B (refer to FIG. 7), the tip part 146 moves together with the straight advancing part 152 in a direction in which the tip part 146 is housed in the lower stage part 24. This causes the game board 100 to be housed in the opening part 26, and the game board 100 can be set in a closed state. When the game board 100 is housed in the opening part 26, the reverse surface 108 of the game board 100 comes in contact with the six game board supporting parts 28.

When the game board 100 is in the closed state, on the player side 110 of the game board 100, the game board 100 is supported by the six game board supporting parts 28. On the dealer side 112 of the game board 100, the dealer side 112 is supported by the two hinge parts 120. In this way, by the six game board supporting parts 28 and the two hinge parts 120, the game board 100 can be stabilized in the closed state.

When the game board 100 is in the closed state, the game board 100 is housed in the opening part 26, and between the game board 100 and the upper stage part 22, there is little space. Therefore, work of opening the game board 100 becomes difficult. The operation lever 144 is to form the space between the game board 100 and the upper stage part 22, and the operation lever 144 can facilitate an operation by an operator such as a store employee.

The opening and closing braking mechanism 180 is a mechanism to facilitate setting the game board 100 in an opened state. For example, as shown in FIG. 4, as the opening and closing braking mechanism 180, two gas springs 182 can be used.

Each of the gas springs 182 has a long shape and is configured to be extendable and contractable. Each of the gas springs 182 has a cylinder body 184 and a piston rod (not shown) which can be housed in the cylinder body 184. The cylinder body 184 is filled with gas such as a nitrogen gas. Each of the gas springs 182 functions as a spring which uses a pressure of the gas filled in the cylinder body 184 as a biasing force.

A first end part of each of the gas springs 182 is rotatably provided on an engaging part 190 provided on the reverse surface 108 of the game board 100. A second end part of each of the gas springs 182 is rotatably provided on an engaging part (not shown) provided on the bottom part of the game table 10. When the game board 100 is in the closed state, the piston rod (not shown) is housed in the cylinder body 184, and the gas springs 182 come to be in a contracted state. When the game board 100 is in the opened state, one part of the piston rod is ejected from the cylinder body 184, and each of the gas springs 182 comes to be in an extended state. In this way, the gas springs 182 are arranged so as to be extendable and contractable between the reverse surface 108 of the game board 100 and the bottom part of the game table 10.

The biasing force of the gas springs 182 is exerted on the game board 100 toward a direction in which the game board 100 is opened. The gas springs 182 function as a braking mechanism. By arranging the gas springs 182, an opening operation of the game board 100 can be assisted so as to avoid sudden opening and closing of the game board 100. In addition, since the biasing force of the gas springs 182 is exerted in the direction in which the game board 100 is opened, as compared with a case where the gas springs 182 are not present, the game board 100 can be opened by a small force, and thus, it can be said that the gas springs 182 also function as an auxiliary mechanism. Hence, without exerting a large force on the game board 100, an operator can easily open the game board 100.

When the game board 100 is in the most opened state, a posture of the game board 100 becomes a nearly upright posture, and of a weight of the game board 100, a component toward the gas springs 182 is reduced. The gas springs 182 are adjusted such that, when the game board 100 is in the most opened state, the game board 100 and the gas springs 182 are balanced and the game board 100 stands still. Thus, the opened state of the game board 100 can be maintained.

As described above, the gas springs 182 are arranged between the reverse surface 108 of the game board 100 and the bottom part of the game table 10 so as to be extendable and contractable. Through the extension and contraction motion thereof, the gas springs 182 functions as an opening and closing braking mechanism and an opening and closing auxiliary mechanism. The gas springs 182 function as the opening and closing braking mechanism, thereby braking the opening and closing operation of the game board 100 and allowing the operation of the game board 100 to be stabilized so as to avoid the sudden opening and closing of the game board 100. In addition, the gas springs 182 function as the opening and closing auxiliary mechanism. In other words, a force to open the game board 100 is invariably exerted on the game board 100 from the gas springs 182. Accordingly, since by the force from the gas springs 182, the game board 100 is going to be opened, without exerting any force on the game board 100 or by exerting a little force on the game board 100 in the direction in which the game board 100 is opened, the game board 100 can be gradually opened. In addition, when the game board 100 is closed, it is not needed to close the game board 100 little by little with the game board 100 being supported, and only by exerting a little force on the game board 100 in a direction in which the game board 100 is closed, the game board 100 can be closed. Thus, the opening and closing operation of the game board 100 is assisted, and without exerting a large force on the game board 100, the game board 100 can be opened and closed, thereby allowing the work to be facilitated.

As shown in FIG. 4, between the game board 100 and the lower stage part 24, the hinge parts 120 are provided. The game board 100 is coupled via the hinge parts 120 to the lower stage part 24 of the game table 10, and the lower stage part 24 is not detached from the game table 10. By the hinge parts 120, operations of the game board 100 from the closed state to the opened state can be controlled to be made constant.

Figure 16B:
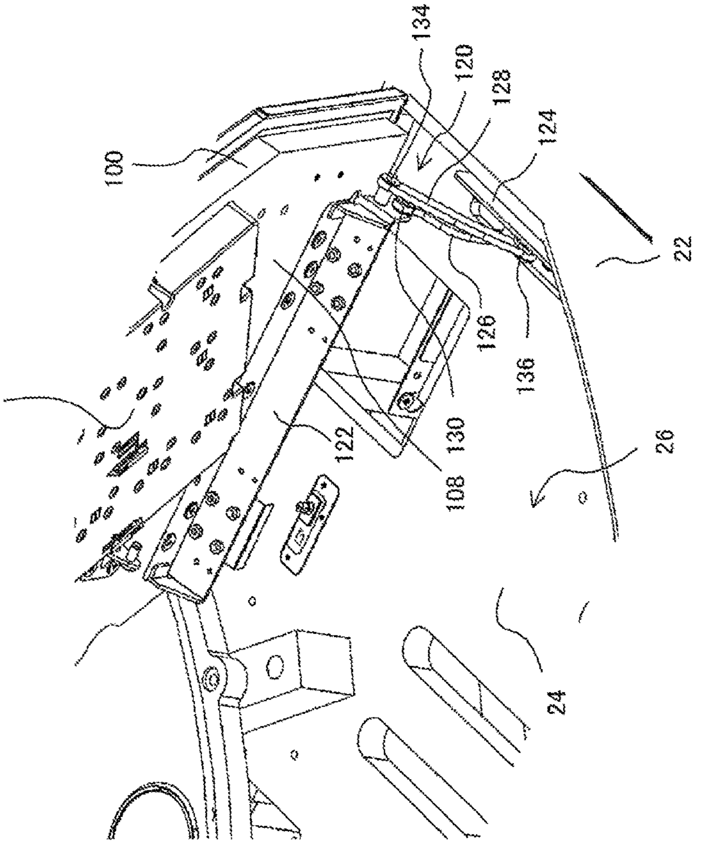
FIG. 16A is an enlarged perspective view illustrating a hinge part 120 and FIG. 16B is an enlarged perspective view illustrating the hinge part 120.
Figure 16A:
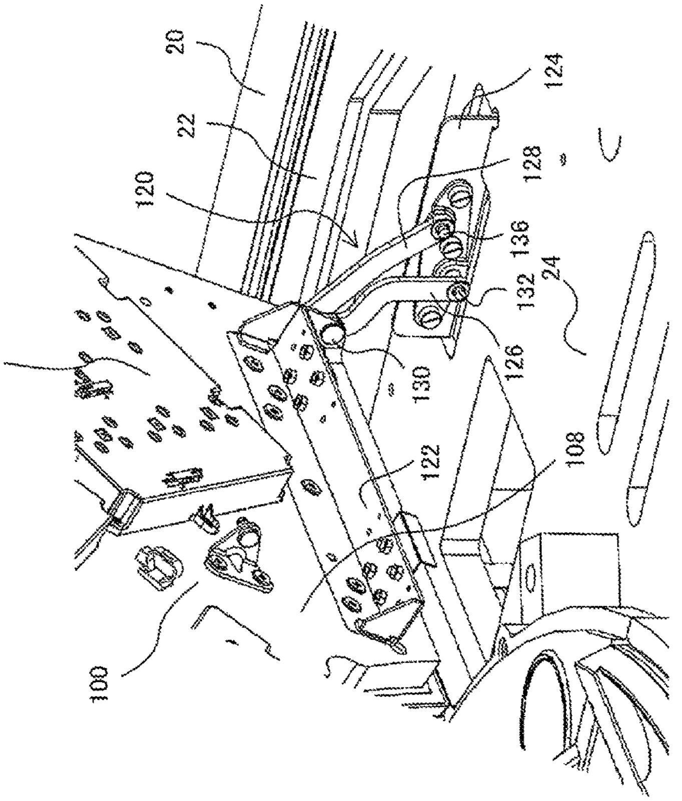

As shown in FIG. 16, each of the hinge parts 120 has a first fixing part 122 fixedly provided on the reverse surface 108 of the game board 100 and a second fixing part 124 fixedly provided on the lower stage part 24. Between the first fixing part 122 and the second fixing part 124, a first lever 126 and a second lever 128 are provided.

A first end part 130 of the first lever 126 is rotatably provided in the first fixing part 122. A second end part 132 of the first lever 126 is rotatably provided in the second fixing part 124. A first end part 134 of the second lever 128 is rotatably provided in the first fixing part 122. A second end part 136 of the second lever 128 is rotatably provided in the second fixing part 124. By the first lever 126 and the second lever 128, a state in which the game board 100 is invariably coupled to the lower stage part 24 of the game table 10 can be maintained.

Figure 17A:
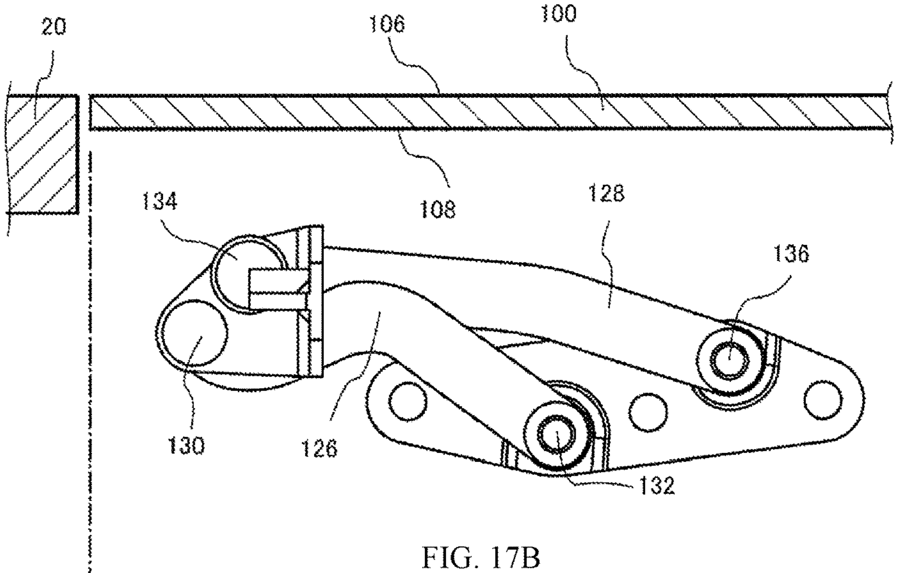
FIG. 17A is a side view illustrating the hinge part 120 in a state in which the game board 100 is closed and FIG. 17B is a side view illustrating the hinge part 120 in a state in which the game board 100 is opened at a predetermined angle Θ.
Figure 17B:
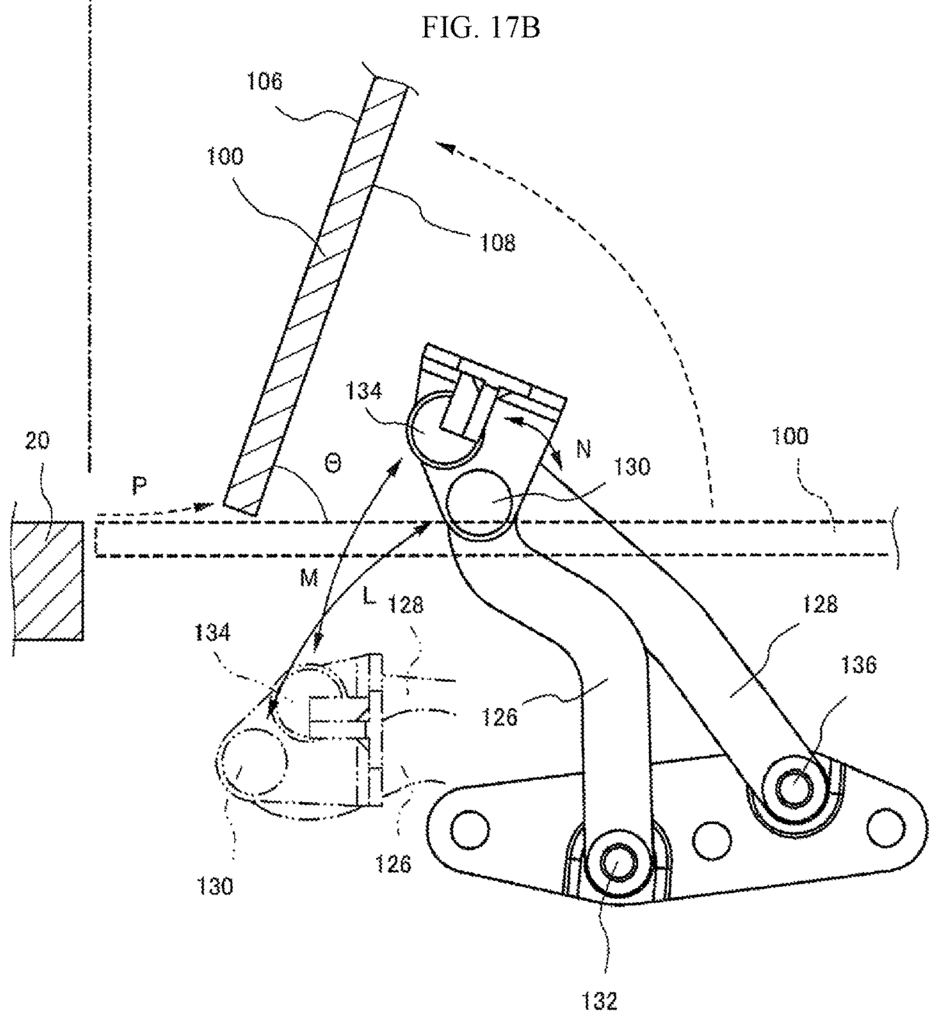

FIG. 17A is a side view illustrating each of the hinge parts 120 in a state in which the game board 100 is closed. FIG. 17B is a side view illustrating each of the hinge parts 120 in a state in which the game board 100 is opened at a predetermined angle Θ. It is to be noted that in FIG. 17B, in order to clarify the difference with the state in which the game board 100 is closed, one part of each of the hinge parts 120 is illustrated by a two-dot chain line and the game board 100 is illustrated by a broken line. In addition, in FIG. 17A and FIG. 17B, in order to clarify the motion, the first fixing part 122 and the second fixing part 124 are omitted.

Figure 18:
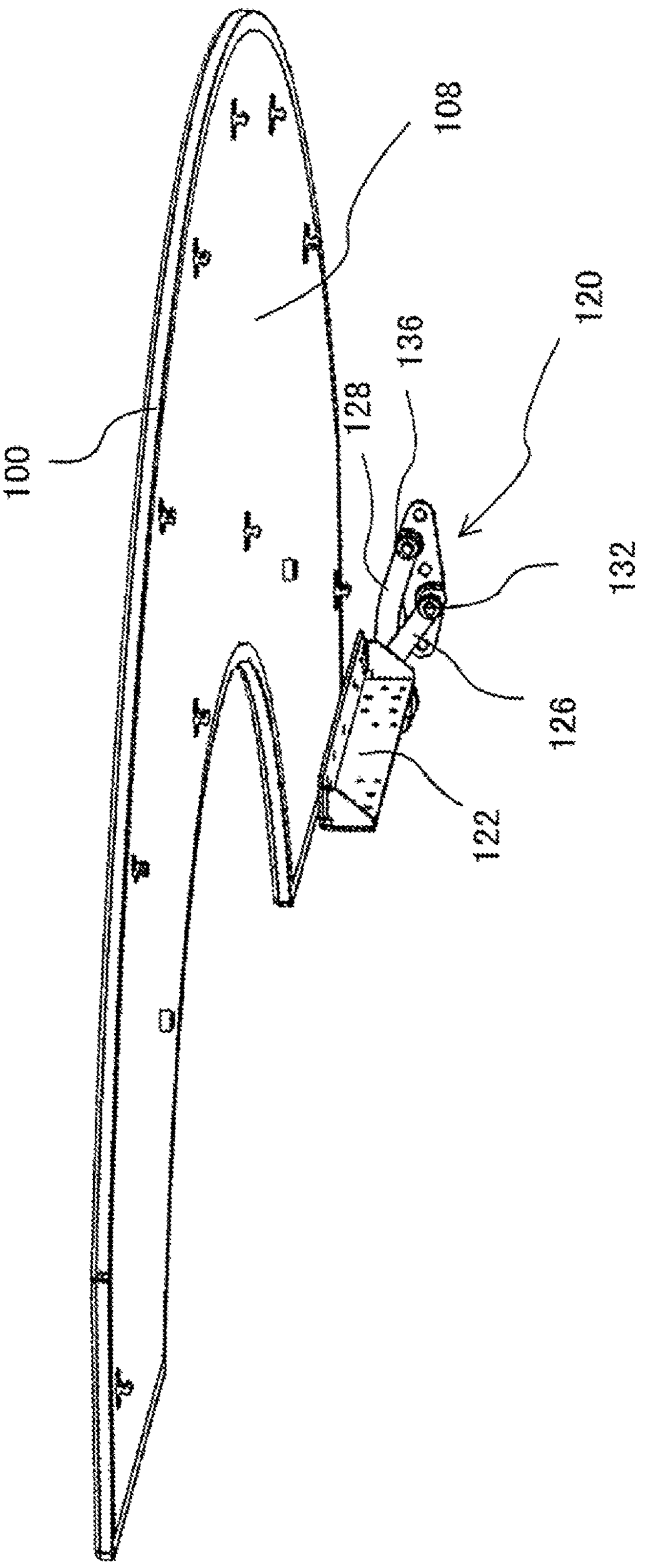
FIG. 18 is a perspective view illustrating a relationship between the hinge part 120 and the game board 100 in the state in which the game board 100 is closed.
Figure 19:
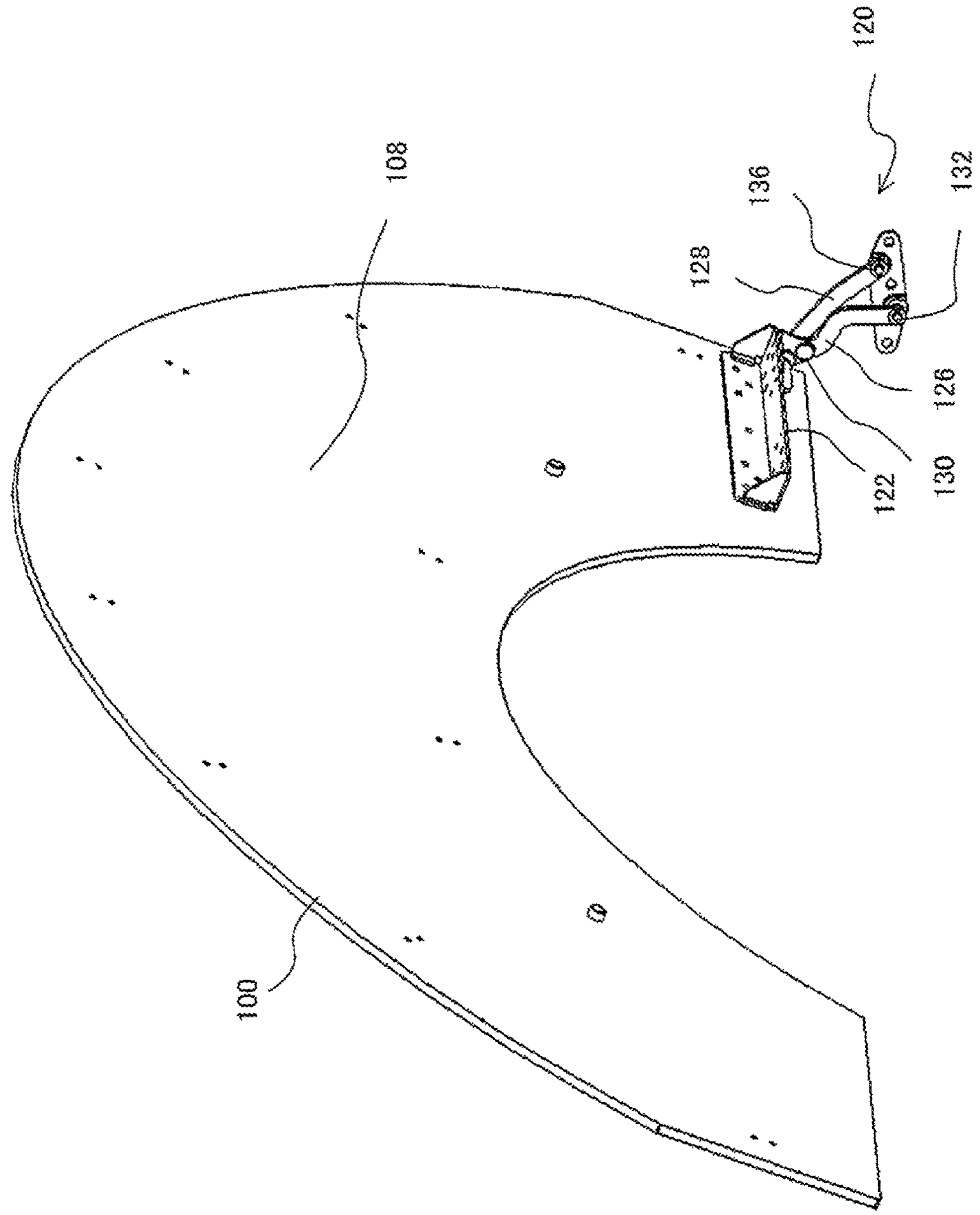
FIG. 19 is a perspective view illustrating a relationship between the hinge part 120 and the game board 100 in the state in which the game board 100 is opened.

FIG. 18 is a perspective view illustrating a relationship between each of the hinge parts 120 and the game board 100 in the state in which the game board 100 is closed. FIG. 19 is a perspective view illustrating a relationship between each of the hinge parts 120 and the game board 100 in the state in which the game board 100 is opened.

In conjunction with the opening and closing of the game board 100, the first lever 126 rotates with the second end part 132 as the center (see an arrow L in FIG. 17B). Similarly, in conjunction with the opening and closing of the game board 100, the second lever 128 rotates with the second end part 136 as the center (see an arrow M in FIG. 17B). A position of the rotation center of the first lever 126 and a position of the rotation center of the second lever 128 are different from each other. In addition, a radius of the first lever 126 is shorter than a radius of the second lever 128. Therefore, a movement trajectory of the first end part 130 of the first lever 126 and a movement trajectory of the first end part 134 of the second lever 128 are not of concentric circles, and the first lever 126 and the second lever 128 can be rotated while a distance between the first end part 130 of the first lever 126 and the first end part 134 of the second lever 128 is kept constant.

By configuring the hinge parts 120 as described above, in conjunction with the opening and closing operation of the game board 100, the first end part 134 of the second lever 128 can rotate with the first end part 130 of the first lever 126 as the center (see an arrow N in FIG. 17B). In other words, as shown in FIG. 17A, FIG. 17B, FIG. 18, and FIG. 19, through the rotation of the first end part 134 of the second lever 128 with respect to the first end part 130 of the first lever 126, the opening and closing operation of the game board 100 can be made constant.

As described above, with the first end part 130 of the first lever 126 as an axis (pivot), the game board 100 is arranged in a pivotable manner (pivotally fixed) on the lower stage part 24 by the hinge parts 120. In the present embodiment, the game board 100 is operable to be opened and closed on the player side 110 and is in the closed state on the dealer side 112. When the game board 100 is opened, the game board 100 forms the predetermined angle Θ (refer to FIG. 17B) with respect to the lower stage part 24.

As described above, the first lever 126 rotates with the second end part 132 as the center (see the arrow L), and the second lever 128 rotates with the second end part 136 as the center (see arrow M). In conjunction with the rotating motion of the first lever 126 and the second lever 128, the first end part 130 of the first lever 126 and the first end part 134 of the second lever 128 are separated from an end part of the top board part 20. Therefore, as indicated by an arrow P in FIG. 17B, the game board 100 is opened such that an end part of the game board 100 is gradually separated from the end part of the top board part 20. Specifically, in the present embodiment, the game board 100 is opened while gradually shifting from the dealer side 112 toward the player side 110.

Further, in conjunction with the rotating motion of the first lever 126 and the second lever 128, the first end part 130 of the first lever 126 and the first end part 134 of the second lever 128 move upwardly (the arrows L and M). Thus, as indicated by the arrow P, the game board 100 is opened so as to rise slightly upwardly from the top board part 20.

As described above, through the opening and closing of the game board 100 with the hinge parts 120, in a course of opening the game board 100, the game board 100 can be moved so as to be gradually separated from the end part of the top board part 20. Thus, in a course of the opening and closing of the game board 100, no interference between the game board 100 and the top board part 20 occurs, and a variety of sheets showing the bet regions or the like, which are attached to the top board part 20, can be prevented from being damaged.

In addition, the game board 100 is supported by the hinge parts 120, thereby allowing a space between the end part of the top board part 20 and the end part of the game board 100 in the state in which the game board 100 is closed to be made small. Thus, the game chips or the like can be prevented from coming thereinto from between the top board part 20 and the game board 100.

Furthermore, the first lever 126 and the second lever 128 have shapes which protrude and curve toward a clockwise direction. The reason why the first lever 126 and the second lever 128 protrude and curve toward the clockwise direction, instead of a counterclockwise direction, is because if the first lever 126 and the second lever 128 curve toward the counterclockwise direction, problems arise when an opening force is exerted on the game board, that is, the problems in that the clockwise rotation of the first lever 126 and the second lever 128 with the axes as the centers (the second end parts 132 and 136) is hampered and in that in some case, the game board 100 cannot be opened, and it is required to avoid these problems. In contrast to this, the first lever 126 and the second lever 128 have the shapes which protrude toward the clockwise direction, whereby the first lever 126 and the second lever 128 can be guided upon opening the game board so as to rotate in the clockwise direction with respect to those axes.

As described above, on the game board 100, the larger number of the antenna modules 300 are provided on the player side 110 than on the dealer side 112 along the outer periphery of the game board 100. This game board 100 is operable to be opened and closed on the player side 110, and is in the closed state on the dealer side 112. Thus, the game board 100 can be opened on the player side 110 on which many antenna modules 300 are attached, thereby allowing work of attaching the multitude of antenna modules 300 and of performing maintenance therefor to be facilitated and enabling the work to be prevented from becoming cumbersome.

In addition, as described above, by the hinge parts 120, the opening auxiliary mechanism 140, and the opening and closing braking mechanism 180, the game board 100 can be easily opened. By setting the game board 100 in the opened state, the antenna modules 300 provided on the reverse surface 108 of the game board 100 can be positioned at a height of a line of sight of a worker. Thus, a worker can perform the maintenance in comfortable posture, thereby allowing an efficiency of the maintenance to be enhanced.

Figure 20:
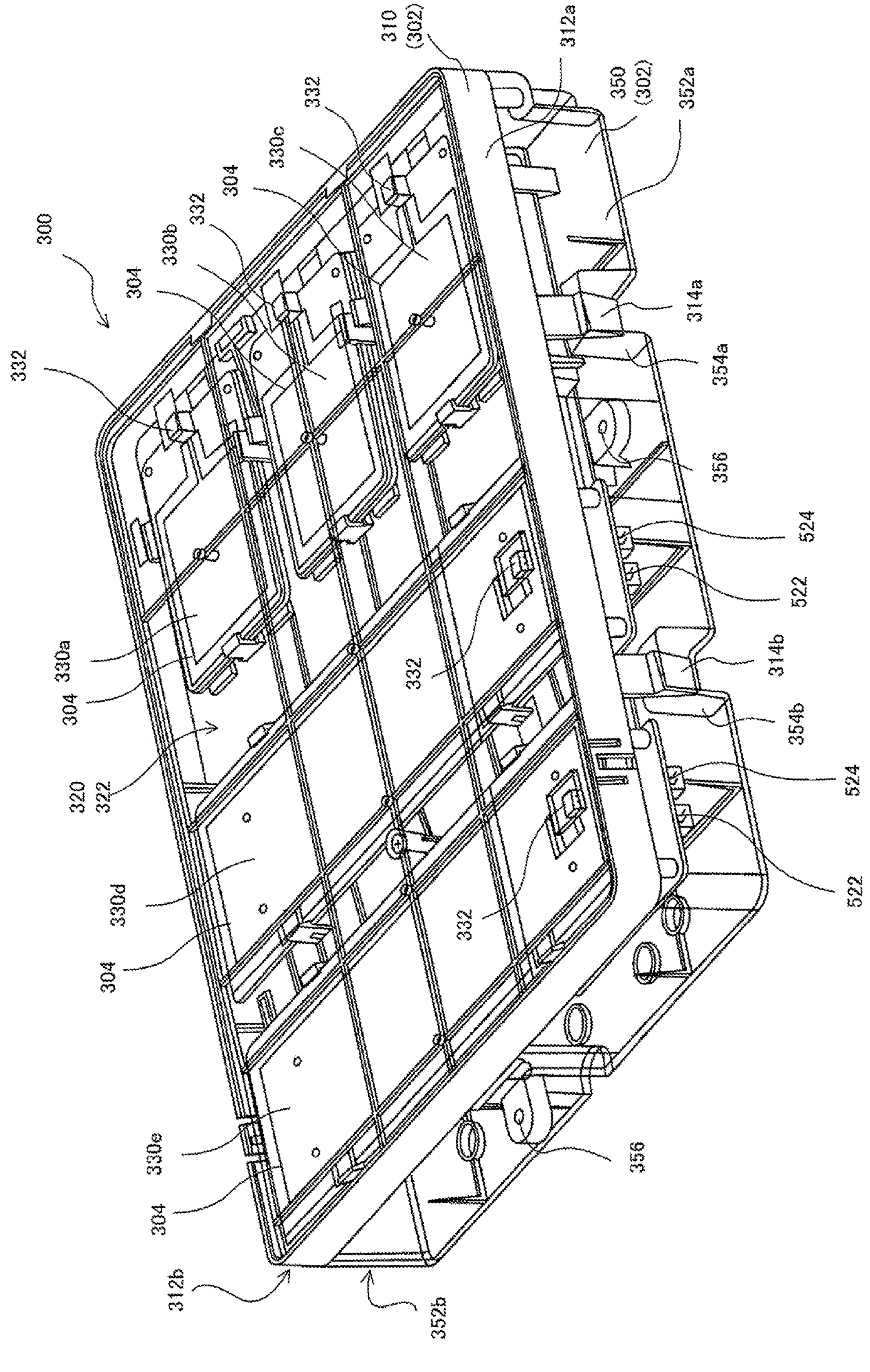
FIG. 20 is a perspective view of an antenna module 300, viewed from an antenna substrate side.
Figure 21:
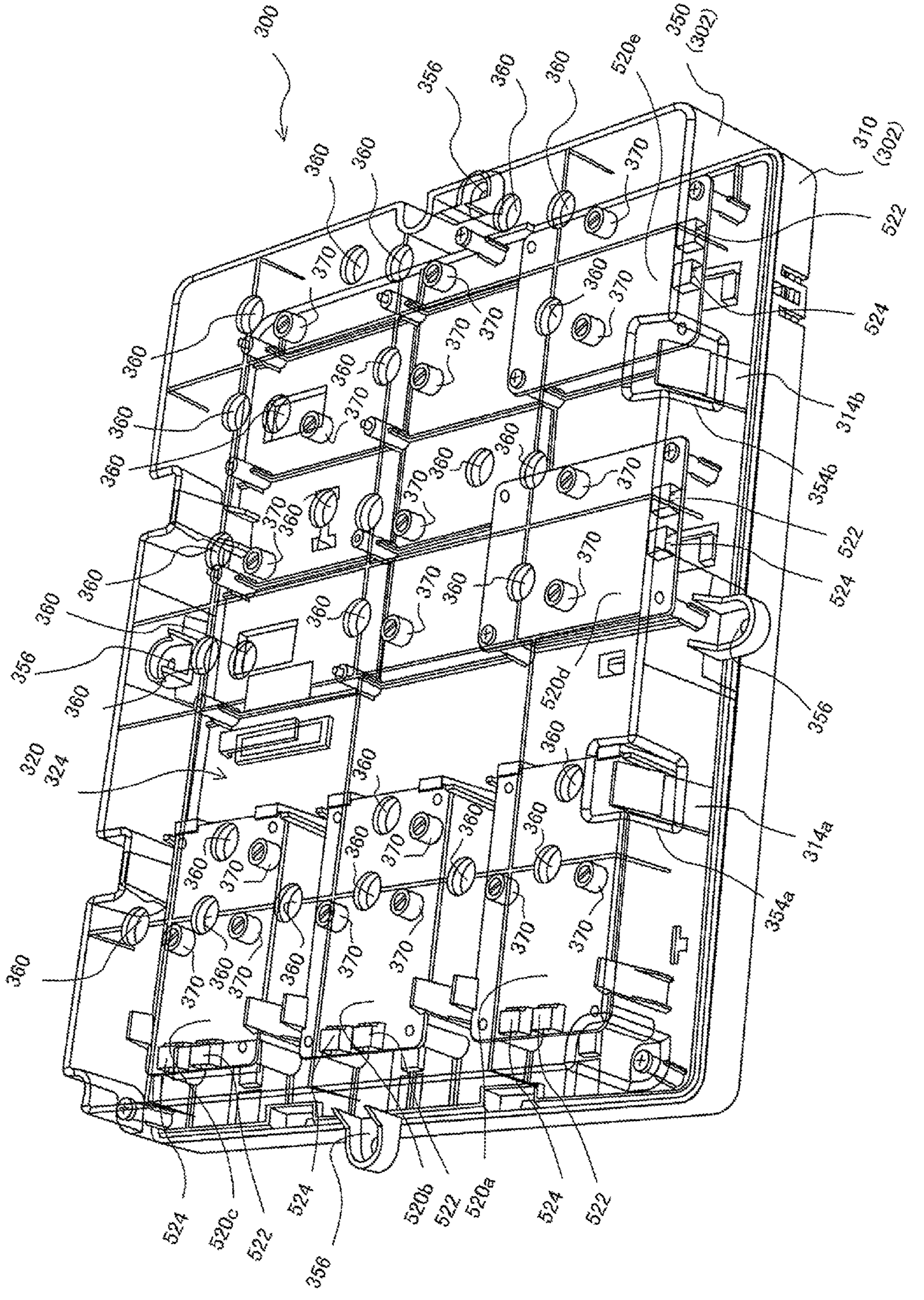
FIG. 21 is a perspective view of the antenna module 300, viewed from a coupler substrate side.
Figure 22:
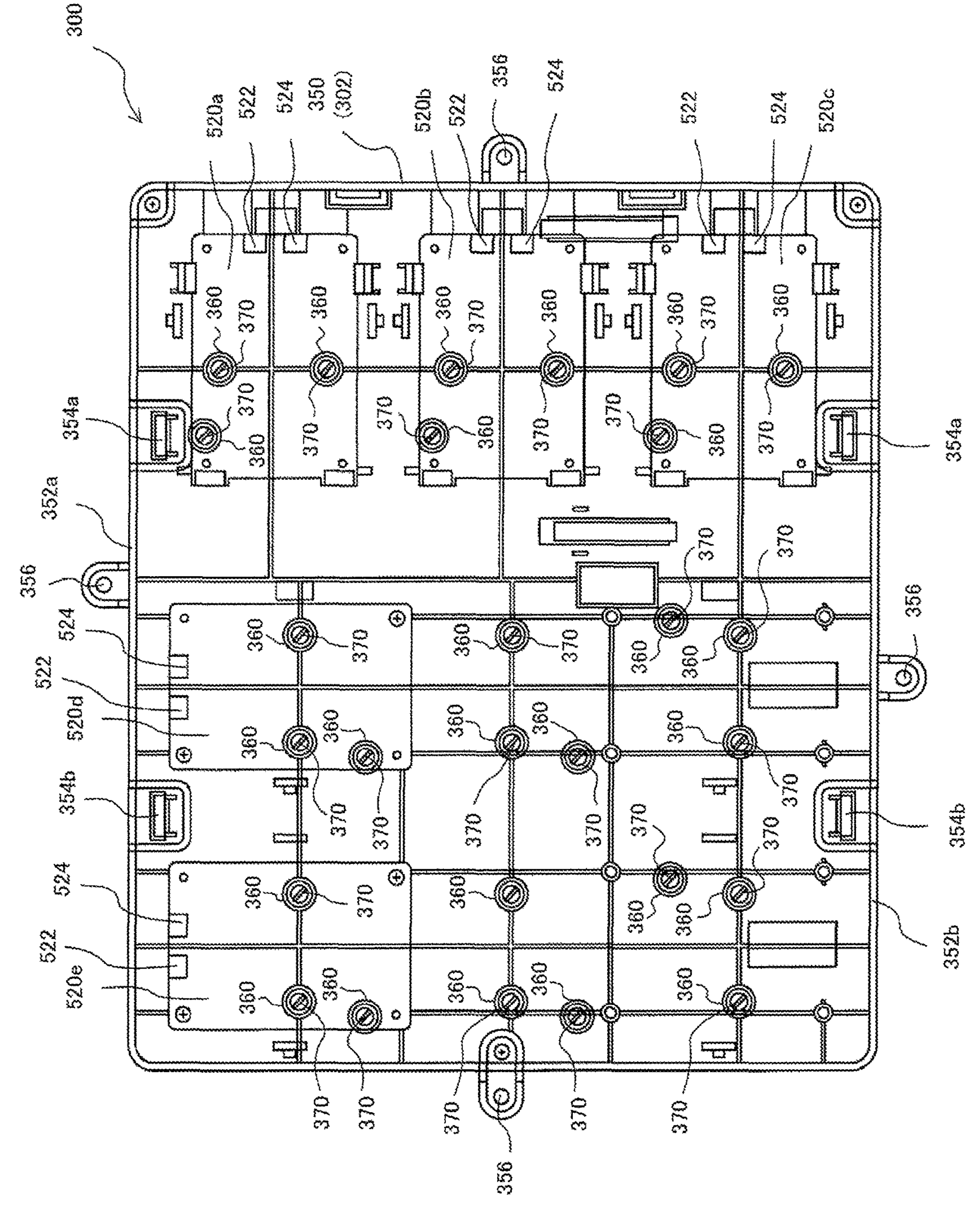
FIG. 22 is a front view of the antenna module 300, viewed from the coupler substrate side.

FIG. 20 is a perspective view of the antenna module 300, viewed from an antenna substrate side. FIG. 21 is a perspective view of the antenna module 300, viewed from a coupler substrate side. FIG. 22 is a front view of the antenna module 300, viewed from the coupler substrate.

The antenna module 300 has a substantially rectangular parallelepiped shape. A housing 302 of the antenna module 300 is constituted of a transparent main body part 310 and a transparent lid body part 350. Each of the main body part 310 and the lid body part 350 has a substantially rectangular parallelepiped shape. By superposing the main body part 310 and the lid body part 350, the housing 302 of the antenna module 300 is formed.

On two side surfaces 312*a* and 312*b* (not shown) of the main body part 310, click parts 314*a* and 314*b* (hooking parts) are formed, respectively. On two side surfaces 352*a* and 352*b* (not shown) of the lid body part 350, through holes 354*a* and 354*b* (hooked parts) are formed, respectively. By inserting the click part 314*a* to the through hole 354*a* and the click part 314*b* to the through hole 354*b* for hooking, the main body part 310 can be detachably attached to the lid body part 350.

The main body part 310 has a supporting body 320. On an antenna arrangement surface 322 of the supporting body 320, antenna substrates 330*a* to 330*e* are arranged. On a circuit board surface 324 of the supporting body 320, coupler substrates 520*a* to 520*e* are arranged. The coupler substrates 520*a* to 520*e* are antenna matching circuits for adjusting matching states of the antennas 304 formed on the antenna substrates 330*a* to 330*e*. Each of the antenna substrates 330*a* to 330*e* has one connector 332 for connecting a cable. Each of the coupler substrates 520*a* to 520*e* has two connectors 522 and 524 for connecting cables.

By connecting the connector 332 of the antenna substrate 330*a* and the connector 522 of the coupler substrate 520*a* by the cable, the coupler substrates 520*a* is electrically connected to the antenna substrate 330*a*. Similarly, the coupler substrate 520*b* is electrically connected to the antenna substrate 330*b*; the coupler substrate 520*c* is electrically connected to the antenna substrate 330*c*; the coupler substrate 520*d* is electrically connected to the antenna substrate 330*d*; and the coupler substrate 520*e* is electrically connected to the antenna substrate 330*e*. Hereinafter, in a case where it is not needed to distinguish the antenna substrates 330*a* to 330*e*, the antenna substrates 330*a* to 330*e* are referred to as antenna substrates 330. Similarly, in a case where it is not needed to distinguish the coupler substrates 520*a* to 520*e*, the coupler substrates 520*a* to 520*e* are referred to as coupler substrates 520.

The connector 524 of each of the coupler substrates 520*a* to 520*e* is communicably connected to the control part 510 (refer to FIG. 23) by the cable. The control part 510 is connected to the game table control apparatus 30 (refer to FIG. 23). Via the control part 510, the antenna substrates 330 can be driven by the game table control apparatus 30.

On the lid body part 350, four through holes 356 (locking parts) are formed. By inserting a screw into each of the four through holes 356 and screwing with the reverse surface 108 of the game board 100, the antenna module 300 can be attached onto the reverse surface 108 of the game board 100.

The antenna module 300 is attached onto the reverse surface 108 of the game board 100 such that the antenna arrangement surface 322 of the supporting body 320 faces the reverse surface 108 of the game board 100. Thus, the antenna modules 300 can be attached so as to allow the antennas 304 of the antenna substrates 330*a* to 330*e* to approach the game board 100 to the maximum extent.

On the surfaces of the antenna substrates 330*a* to 330*e*, the antennas 304 are formed, respectively. Each of the antenna substrates 330*a* to 330*e* is a substrate obtained by forming a pattern (conductor pattern) of each of the antennas 304 on a substrate such as a glass epoxy substrate by using a conductive material.

A number, sizes, and shapes of the antenna substrates 330*a* to 330*e* are determined in accordance with sizes and shapes of the bet regions (not shown) in the game regions 102*a* to 102*g*, which are determined based on a kind of a game. It is only required to appropriately determine the antenna substrates 330*a* to 330*e* depending on a kind of a game. In FIG. 20 to FIG. 22, although the five antenna substrates 330*a* to 330*e* are shown, it is only required to determine a number thereof depending a kind of a game such as blackjack and baccarat.

The control part 510 constitutes a reader/writer control apparatus. The control part 510 is electrically connected to the antennas 304 of the antenna substrates 330*a* to 330*e*. The control part 510 can access, via the antennas 304, the RFID IC tags (not shown) provided inside of the game chips. Specifically, the control part 510 reads or writes a variety of pieces of chip information stored in the RFID IC tags of the game chips through wireless communication using the antennas 304.

Figure 23:
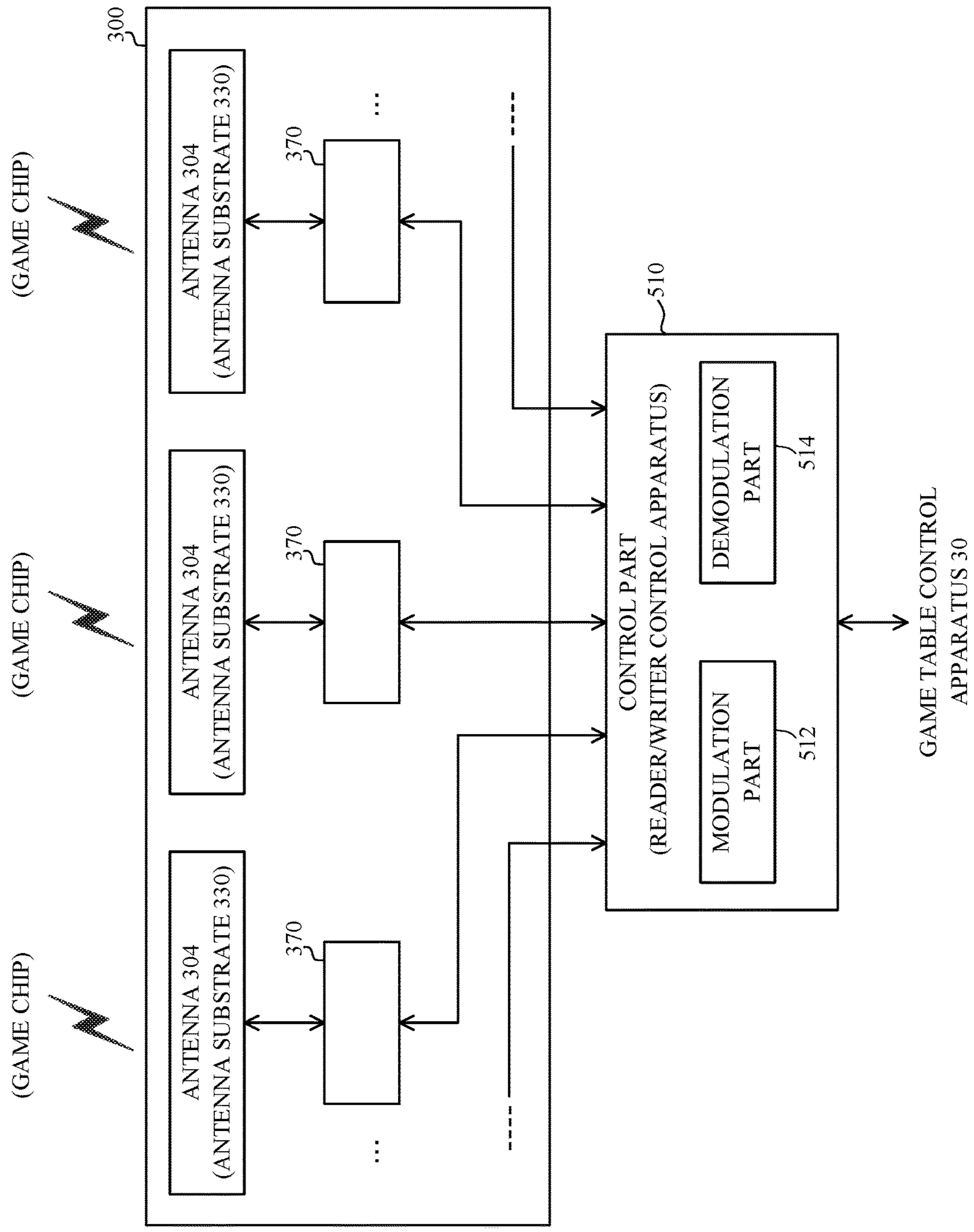
FIG. 23 is a block diagram showing a configuration of the antenna module 300 and a control part 510.

FIG. 23 is a block diagram showing a configuration of the antenna module 300 and the control part 510. As shown in FIG. 23, the control part 510 as the reader/writer control apparatus receives an instruction issued from the game table control apparatus 30. In response to the received instruction, the control part 510 accesses the RFID IC tags of the game chips. It is to be noted that although in FIG. 23, as the antenna module 300, only the antennas 304 (antenna substrates 330) and the adjusting parts 370 are shown, as shown in FIG. 20 to FIG. 22, the antenna module 300 has the antenna substrates 330 and the coupler substrates 520. Accordingly, as the antenna module 300 shown in FIG. 23, it is only required to include the adjusting parts 370 for adjusting the matching states of the antennas 304. It is to be noted that the adjusting parts 370 will be described later.

The control part 510 reads the chip identification information issued from the game chips. The control part 510 transmits the read chip identification information to the game table control apparatus 30. The control part 510 is constituted of, for example, a microcomputer having a CPU, a ROM, and a RAM (not shown).

As described above, the control part 510 has a function to wirelessly communicate with the RFID IC tags of the game chips via the antennas 304. The control part 510 has a modulation part 512 and a demodulation part 514. The control part 510 is constituted of, for example, an RF module or the like having a modulation circuit and a demodulation circuit.

The modulation part 512 modulates a carrier wave by a predetermined modulation system based on predetermined information such as a command, a request, and an instruction received by the control part 510, generates a modulation wave (modulation signal), and outputs the generated modulation wave as an RF signal. The outputted RF signal is supplied to each of the antennas 304 and is radiated as an electromagnetic wave from each of the antennas 304.

Supplied to the demodulation part 514 is the modulation wave received by each of the antennas 304 as the modulation signal. This modulation wave is an electromagnetic wave which is obtained by modulating the carrier wave by the predetermined modulation system based on the data which the RFID IC tags have stored in the game chips. The demodulation part 514 demodulates the modulation signal supplied from each of the antennas 304, takes out the data which the RFID IC tags have stored therein, and transmits the data to the control part 510. In this way, the chip identification information which the RFID IC tags have stored therein is passed to the control part 510.

In this manner, by the control part 510, the electromagnetic waves from the antennas 304 formed on the antenna substrates 330*a* to 330*e* are transmitted and received, whereby accessing the RFID IC tags of the game chips placed in the bet regions can be performed.

As described above, the antenna substrates 330_a_ to 330_e_ are determined in accordance with the sizes and shapes of the bet regions (not shown) of the game regions 102.

As described above, the antennas 304 for communicating with the RFID IC tags of the game chips are provided as the antenna substrates 330_a_ to 330_e_ in the antenna module 300, Therefore, in the antenna module 300, among the five antennas 304, some antennas are located in proximity to each other. Further, the antenna module 300 is provided so as to correspond to each of the game regions 102_a_ to 102_g_. Therefore, there is also a case where antennas 304 provided in two antenna modules 300 are mutually located in proximity to each other.

In this manner, when the antennas 304 which are located in proximity to each other are concurrently turned on, interference of electromagnetic waves occurs, and there may be a case where a reading operation and a writing operation cannot be appropriately performed. Therefore, the control part 510 controls turning on and off of the antennas 304 of the antenna module 300. Specifically, the control part 510 performs the control such that concurrent turning on of a plurality of antennas 304 which are located in proximity to each other is avoided, and a plurality of antennas 304 which are located in positions separated from each other are concurrently turned on to a degree at which the interference of the electromagnetic waves does not occur. Since the plurality of antennas 304 which are located in proximity to each other are controlled not to be concurrently turned on, it is made possible not to cause the interference. In addition, since the plurality of antennas 304 which are located in the positions separated from each other are concurrently turned on to the degree at which the interference does not occur, by increasing the antennas 304 which can concurrently perform communication, quick communication can be performed.

In the present embodiment, two control part 510 are provided on the game table 10, and the two control parts 510 mutually communicate with each other and separately control the turning on and off of the plurality of antennas 304 provided on the game table 10. Thus, the plurality of antennas 304 which are located in proximity to each other can be controlled not to be concurrently turned on.

As described above, by outputting the electromagnetic waves from the antennas 304, accessing the RFID IC tags of the game chips is performed. Intensities, frequencies, ranges of spreading of the electromagnetic waves outputted from the antennas 304 are greatly influenced by various conditions. For example, magnetic fields formed by the antennas 304 are influenced by floating capacitance, noise, and the like generated by a variety of metal connecting lines (not shown) wired around the game board 100. The magnetic fields formed by the antennas 304 are influenced, thereby exerting influence on reading accuracy of the RFID IC tags. As the variety of connecting lines, there are power source wires for current supply to excite the antennas 304, connecting lines for connecting the antenna substrates 330 and the coupler substrates 520, and the like. Depending on wiring methods such as positions, bundling manners, lengths, and the like of wires of these variety of connecting lines, locations where the floating capacitance and the noise are generated and magnitudes thereof vary, and bias is caused in the magnetic fields formed by the antennas 304.

The positions, the lengths, and the like of the wires of these connecting lines are determined to some extent at the time of designing the game board 100. Accordingly, in accordance with the lengths, and the like of the wires of the connecting lines, sensitivities, intensities, and the like of the antennas 304 can be previously adjusted. As described above, in the present embodiment, the antenna substrates 330_a_ to 330_e_ are modularized and configured as the antenna module 300. Therefore, through the modularization as the antenna module 300, by previously adjusting the plurality of antennas 304, which are encapsulated in one antenna module 300, in a manufacturing process, the adjustment of the antennas 304 upon assembling can be easily performed. In addition, even in a case where the positions of the antennas are changed for the replacement of the antennas 304 upon performing the maintenance, a change of a kind of a game to be executed, and the like, since the positional relationship of the plurality of antennas 304 in the antenna module 300 is retained, maladjustment of the sensitivities and the intensities, caused by the mutual influence among the antennas 304, can be prevented from unexpectedly occurring. Further, it is preferable that after assembling the antenna module 300, the sensitivities and the intensities of the antenna substrates 330_a_ to 330_e_ can be adjusted. The adjusting part 370 for adjusting the electromagnetic waves outputted from each of the antennas 304 is provided for each of the coupler substrates 520.

Specifically, as the adjusting part 370, there are a variable resistor whose resistance value can be changed, a variable capacitor whose capacitance can be changed, and the like. The adjusting part 370 is not limited to the variable resistor and the variable capacitor, and it is only required for the adjusting part 370 to be an element, such as a DIP switch, which can adjust and switch the electromagnetic waves, and it is only required for the adjusting part 370 to be an element whose various parameters can be changed by an operator.

In the lid body part 350, a plurality of through holes 360 for adjusting the adjusting parts 370 are previously formed. By using an adjusting tool such as a driver, an operator such as a store employee can operate the adjusting parts 370 via the through holes 360. The through holes 360 of the lid body part 350 are formed in the lid body part 350 so as to face the adjusting parts 370 provided on the coupler substrates 520. It is to be noted that the present invention is not limited to the case where the through holes 360 are formed so as to face the adjusting parts 370, and it is only required for the through holes 360 to be formed in accordance with a motion and a shape of the adjusting tool used for the adjustment.

In this manner, the through holes 360 are formed in the lid body part 350, thereby allowing the adjusting parts 370 to be operated in a state of the antenna module 300 and the electromagnetic waves outputted from the antennas 304 to be adjusted. In addition, without detaching the lid body part 350 from the main body part 310, the adjusting parts 370 can be operated.

As described above, before attaching the antenna modules 300 to the game board 100, the electromagnetic waves outputted from the antennas 304 can be previously adjusted. Further, also after attaching the antenna modules 300 to the game board 100, adjustment of the intensities and the frequencies of the electromagnetic waves outputted from the antennas 304 for optimization may be needed anew. Even in such a case, without detaching the antenna modules 300 from the game board 100, the adjusting parts 370 can be adjusted.

As described above, each of the antenna modules 300 is provided so as to correspond to each of the game regions 102_a_ to 102_g_, respectively. Similarly, the antenna module 300' (not shown) is provided so as to correspond to each of the erasure antenna device 400, the reference antenna device 410, and the registration antenna device 420. The antenna module 300' has the same configuration as the configuration of the antenna module 300 and has an antenna substrate 330' and a coupler substrate 520' whose each shape and size are in accordance with a shape and a size of each of the erasure antenna device 400, the reference antenna device 410, and the registration antenna device 420.

Figure 24:
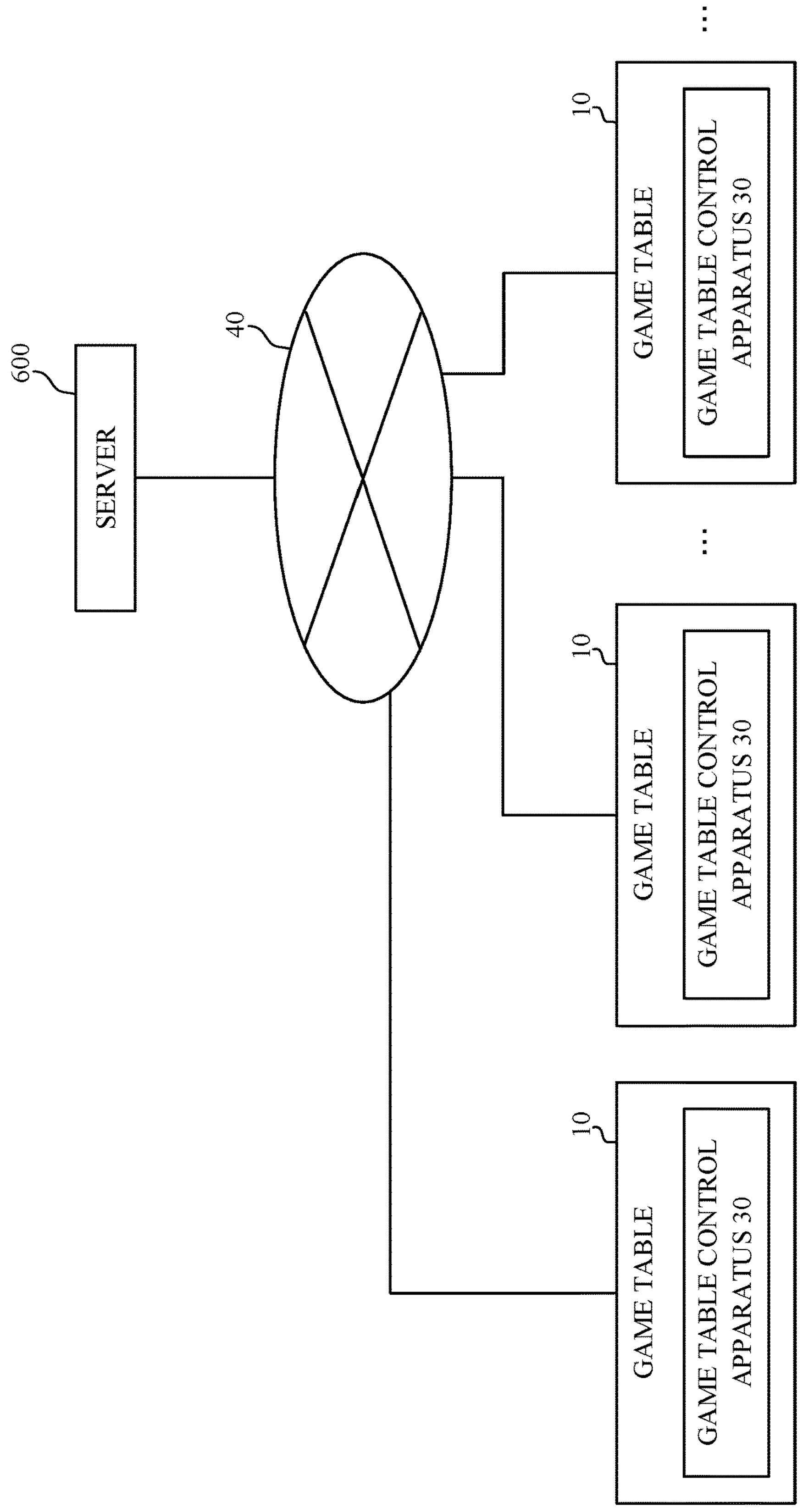
FIG. 24 is a diagram showing a network configuration in a game facility such as a casino.

FIG. 24 is a diagram showing a network configuration in a game facility such as a casino. In a game facility, via a network 40, the server 600 and a plurality of game tables 10 are communicably connected. As described above, on the game table 10, the game table control apparatus 30 is mounted, and the game table control apparatus 30 communicates with the server 600 via the network 40.

In a game facility such as a casino, besides the game tables 10, a cashier (not shown) is also communicably connected with the server 600 via the network 40.

Figure 25:
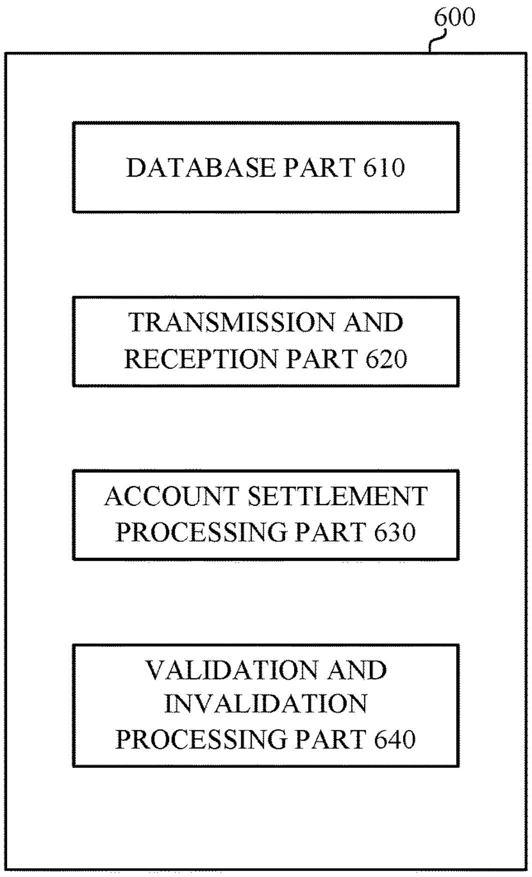
FIG. 25 is a block diagram showing a configuration of a server 600.

FIG. 25 is a block diagram showing a configuration of the server 600. The server 600 mainly has the database part 610, a transmission and reception part 620, an account settlement processing part 630, and a validation and invalidation processing part 640. It is to be noted that the server 600 is constituted of a computer mainly having a CPU (central processing unit), a ROM (read-only memory), a RAM (random access memory), a HDD (hard disk drive), and a communication interface (each not shown). By these CPU, ROM, RAM, HDD, communication interface, and the like, the database part 610, the transmission and reception part 620, the account settlement processing part 630, and the validation and invalidation processing part 640 are configured.

The database part 610 stores a variety of pieces of chip information of each of the game chips so as to associate with the chip identification information. The database part 610 has one record with respect to one game chip.

Figure 26:
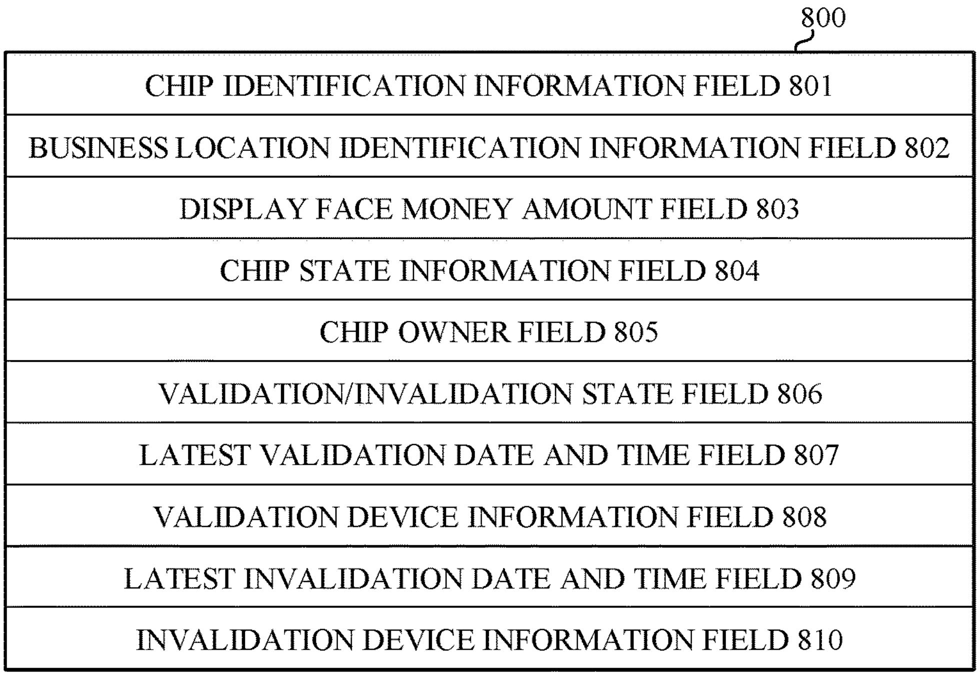
FIG. 26 is a diagram showing an example of a data configuration of one record stored in a database part 610.

FIG. 26 is a diagram showing an example of a data configuration of one record 800 stored in the database part 610. The record 800 has a chip identification information field 801, a business location identification information field 802, a display face money amount field 803, a chip state information field 804, a chip owner field 805, a validation/invalidation state field 806, a latest validation date and time field 807, a validation device information field 808, a latest invalidation date and time field 809, and an invalidation device information field 810.

In the chip identification information field 801, chip identification information stored in the RFID IC tags of the game chips is stored. In the business location identification information field 802, information identifying a game facility, a hotel, and the like where the game chips are used is stored. In the display face money amount field 803, a value of a display money amount of a game chip is stored. For example, when a monetary value of a game chip is $10, "10" is stored, or when a monetary value of a game chip is $100, "100" is stored.

In the chip state information field 804, information showing an accounting state of a game chip is stored. For example, information showing that game chips have been handed over to a player in exchange for cash, information showing that game chips have been dealt to a player as a payout, information showing that game chips have been collected from a player, information showing that game chips have been exchanged for cash, and the like are stored in the chip state information field 804.

At a cashier, when game chips have been handed over to a player in exchange for cash, on the server 600, information showing that game chips have been handed over to a player in exchange for cash is stored in the chip state information field 804. In addition, when a player has won in games, based on the reading-out of the chip identification information from game chips from the registration antenna device 420, on the server 600, information showing that game chips have been dealt to a player as a payout is stored in the chip state information field 804. Further, when a player has lost in games, based on the reading-out of the chip identification information from game chips from the erasure antenna device 400, on the server 600, information showing that game chips have been collected from a player is stored in the chip state information field 804. Further, at a cashier, when a player has returned game chips in exchange for cash, on the server 600 information showing that game chips have been exchanged for cash is stored in the chip state information field 804.

In the chip owner field 805, information showing an owner of game chips, for example, player identification information or the like is stored. In the validation/invalidation state field 806, validation/invalidation information showing whether game chips are valid or invalid is stored. The validation/invalidation information is information showing that game chips are validated or information showing that game chips are invalidated.

In the present embodiment, all game chips used in a game facility are validated and invalidated. As described later, validated game chips have monetary values in a game facility, and it is permitted that the validated game chips are exchanged for cash at a cashier and are used for payment at a store such as a restaurant instead of cash. On the other hand, invalidated game chips have no monetary values in a game facility and cannot be used in a game facility or the like.

The validation and invalidation of game chips are managed on the server 600. Specifically, by the validation/invalidation information stored in the validation/invalidation state field 806, the validation and invalidation of all game chips used in a game facility are managed. When game chips are lent to a player, those game chips have been validated. On the other hand, when game chips are not lent to a player, those game chips have been invalidated. It is to be noted that a case where a player keeps invalidated game chips by a fraudulent act is excluded.

When game chips are lent to a player, since game chips have monetary values, game chips are validated. All of validated game chips are determined and monetary values are calculated, thereby allowing a financial account in a game facility at that point in time to be settled. Therefore, by validating game chips, also in a game facility such as a casino where 24-hour business is operated, account settlement processing can be executed.

For example, when a game outcome is determined and a player has won and obtains a payout, a dealer hands over game chips in accordance with the payout to a player. At this time, a dealer takes out from invalidated game chips in accordance with the payout from the chip tray 80, validates the taken out game chips by using the registration antenna device 420, and hands over the validated game chips to a player.

Specifically, when chip identification information of the invalidate game chips is read out by the registration antenna device 420, the game table control apparatus 30 of the game table 10 transmits to the server 600 the read-out chip identification information and player identification information indicating a player to whom game chips are handed over. The server 600 receives the chip identification information and the player identification information. In the validation/invalidation state field 806, validation information showing that game chips have been validated is stored. In the chip owner field 805, the player identification information is stored. In the chip state information field 804, information showing that game chips have been dealt to a player as a payout is stored. Thus, a correspondence relationship (association) between the chip identification information and the player identification information is formed, the game chips handed over to a player are validated, and those game chips are in a state in which the game chips are lent to a player from a game facility. This generates monetary values of the game chips.

In addition, when a game outcome is determined and a player has lost, a dealer collects game chips placed in the bet regions. At this time, first, a dealer collects the game chips place in the bet regions, invalidates the collected game chips by using the erasure antenna device 400, and houses the invalidated game chips in the chip tray 80.

Specifically, when chip identification information of the collected game chips is read out by the erasure antenna device 400, the game table control apparatus 30 of the game table 10 transmits the read-out chip identification information to the server 600. The server 600 receives the chip identification information, stores in the validation/invalidation state field 806 the invalidation information showing that the game chips have been invalidated, deletes the player identification information stored in the chip owner field 805, and stores in the chip state information field 804 the information showing that the game chips have been collected from a player. Thus, a correspondence relationship (association) between the chip identification information and the player identification information is released, the collected game chips are invalidated, and those game chips are set in a state in which the game chips are returned from a player to a game facility. This vanishes monetary values of the game chips.

Further, at a cashier, a player receives game chips in exchange for cash. At this time, a cashier takes out invalidated game chips in accordance with cash from a storage cabinet such as a cashbox, validates the taken-out game chips by using the registration antenna device 420, and hands over the validated game chips to a player. It is to be noted that a registration antenna device 420 installed at the cashier also has the same configuration as that of the registration antenna device 420 of the game table 10.

Specifically, when chip identification information of the invalidated game chips is read out by the registration antenna device 420, a chip reading device (not shown) at the cashier transmits to the server 600 the read-out chip identification information and player identification information showing a player to whom the game chips are handed over. The server 600 receives the chip identification information and the player identification information, stores in the validation/invalidation state field 806 the validation information showing that the game chips have been validated, stores in the chip owner field 805 the player identification information, and stores in the chip state information field 804 the information showing that the game chips have been handed over to a player in exchange for cash. Thus, a correspondence relationship (association) between the chip identification information and the player identification information is formed, the game chips handed over to a player are validated, and those game chips are set in a state in which the game chips are lent from a game facility to a player. Also in this case, monetary values of game chips are generated.

Furthermore, there may be a case where a player exchanges game chips for cash at a cashier. First, the cashier confirms using the erasure antenna device 400 whether game chips received from a player are valid. In other words, by using the erasure antenna device 400, the chip reading device at the cashier transmits the read-out chip identification information to the server 600. The server 600 receives the chip identification information, reads out the validation/invalidation information in the validation/invalidation state field 806, and transmits the read-out validation/invalidation information to the chip reading device at the cashier. By the validation/invalidation information transmitted from the server 600, the cashier can confirm whether or not the game chips are valid. Only when the game chips received from a player are valid, a player can exchange the game chips for cash. It is to be noted that an erasure antenna device 400 installed at the cashier also has the same configuration as that of the erasure antenna device 400 of the game table 10.

When the game chips received from a player are valid, by using the erasure antenna device 400, the chip reading device at the cashier transmits the read-out chip identification information to the server 600. The server 600 receives the chip identification information, stores in the validation/invalidation state field 806, invalidation information showing that the game chips have been invalidated, deletes the player identification information stored in the chip owner field 805, and stores in the chip state information field 804 the information showing that the game chips have been exchanged for cash. Thus, a correspondence relationship (association) between the chip identification information and the player identification information is released, the game chips received from a player are invalidated, and those game chips are set in a state in which the game chips are returned from a player to a game facility. This vanishes the monetary values of the game chips. The invalidated game chips are housed in a storage cabinet such as a cashbox.

The validated game chips have the monetary values, and it is permitted that the validated game chips are exchanged for cash at a cashier and are used for payment at a store such as a restaurant instead of cash. On the other hand, the invalidated game chips have no monetary values and cannot be used in a game facility or the like.

In the latest validation date and time field 807, the date and time at which the game chips were validated last is stored. In the validation device information field 808, information for identifying a device which read RFID IC tags of the game chips when the game chips were validated last is stored.

In the latest invalidation date and time field 809, date and time at which the game chips were invalidated last is stored. In the invalidation device information field 810, information for identifying a device which read RFID IC tags of the game chips when the game chips were invalidated last is stored.

The transmission and reception part 620 transmits and receives a variety of pieces of data between the game table 10 and a cashier or the like. For example, an inquiry signal on whether game chips whose chip identification information has been read out by the reference antenna device 410 have been validated or invalidated is transmitted from the game table control apparatus 30 of the game table 10 to the server 600. When the transmission and reception part 620 has received this inquiry signal, the server 600 references the database part 610 and searches the chip identification information field 801 in which chip identification information of the inquired game chips is stored. From the validation/invalidation state field 806 of the record 800 whose chip identification information matches the chip identification information of the inquired game chips, the validation/invalidation information is read out. Next, the server 600 transmits the validation/invalidation information to the game table control apparatus 30 of the game table 10.

The game table control apparatus 30 of the game table 10 displays the validation/invalidation information transmitted from the server 600 on the display 70. A dealer at the game table 10 visually recognizes the validation/invalidation information displayed on the display 70 and thus, can confirm whether or not the game chips whose chip identification information is read out by the reference antenna device 410 are appropriate as game chips to be dealt to a player or whether or not the game chips whose chip identification information is read out by the reference antenna device 410 are appropriate as game chips to be collected into the chip tray 80.

In this manner, when the chip identification information is read out by the reference antenna device 410, the inquiry signal is transmitted to the server 600, and on the server 600, in accordance with the chip identification information, the validation/invalidation information is read out from the validation/invalidation state field 806. Accordingly, when the chip identification information is read out by the reference antenna device 410, on the server 600, updating the variety of pieces of information is not performed.

The account settlement processing part 630 references the database part 610 at predetermined timing, searches the validation/invalidation state field 806 with respect to all of the game chips registered in the database part 610, and extracts all of validated game chips and all of invalidated game chips. Since the extracted game chips are all of the game chips which are valid to be used for account settlement processing at the point in time, all of the game chips have monetary values. With respect to all of the extracted game chips, the account settlement processing part 630 reads out a value of a display money amount of the game chips from the display face money amount field 803 and executes the account settlement processing at that timing.

In this manner, game chips are lent to a player, only the game chips having the monetary values are extracted, and a total amount of the validated game chips can be calculated. Also in a game facility such as a casino where the 24-hour business is operated, the account settlement processing can be executed at appropriate timing.

The validation and invalidation processing part 640 updates the player identification information and the validation/invalidation information. Specifically, when the chip identification information read out by the registration antenna device 420 is transmitted together with the player identification information from the game table 10, the validation and invalidation processing part 640 searches the chip identification information field 801 and looks for the record 800 which matches the transmitted chip identification information. Next, in the chip owner field 805 of the record 800 which the chip identification information matches, the player identification information is stored, and the information showing that the game chips have been validated is stored as the validation/invalidation information in the validation/invalidation state field 806. This forms a correspondence relationship (association) between the chip identification information and the player identification information.

In addition, when the chip identification information read out by the erasure antenna device 400 is transmitted from the game table 10, the validation and invalidation processing part 640 searches the chip identification information field 801 and looks for the record 800 which matches the transmitted chip identification information. Next, the player identification information stored in the chip owner field 805 of the record 800 which the chip identification information matches is deleted, and information showing that the game chips have been invalidated is stored as the validation/invalidation information in the validation/invalidation state field 806. This releases the correspondence relationship (association) between the chip identification information and the player identification information.

In the above-described example, the case where the validation/invalidation information is stored in the validation/invalidation state field 806 of the server 600 is described. However, the validation/invalidation information may be stored in the RFID IC tags of the game chips so as to be readable and writable. Through the above-described configuration, without communicating with the server 600, the validation/invalidation information can be read out and written thereinto, thereby allowing whether the game chips have been validated or invalidated to be determined.

Similarly, in the above-described example, the case where the value of the display amount of the game chips is stored in the display face money amount field 803 of the server 600 is described. The value of the display amount of the game chips may be stored in the RFID IC tags of the game chips. Through the above-described configuration, without communicating with the server 600, the value of the display amount of the game chips can be read out.

REFERENCE SIGNS LIST

10 game table
20 top board part (game board mounting table top)
100 game board
120 hinge parts (opening and closing coupling device)
140 opening auxiliary mechanism (opening auxiliary device)
180 opening and closing braking mechanism (opening and closing braking device)
300 antenna module
304 antennas
600 server

The invention claimed is:

1. A game table comprising:

a game board having a front-side corresponding to a player position and a rearward side corresponding to a dealer position, the game board being raiseable and lowerable, and a registration antenna and an erasure antenna, wherein, each of the registration and erasure antennas are in electronic communication with a database that stores game chip identification information, wherein, the registration antenna reads game chip identification information stored on one or more game chips via wireless communications means, the chip identification information is electronically transmitted to the database, the database associates the chip identification information with a game player to thereby validate the one or more game chips, and wherein, the erasure antenna reads game chip identification information stored on the one or more game chips via wireless communications means, the chip identification information is electronically transmitted to the database, the database disassociates the chip identification information associated with the game player to thereby invalidate the one or more game chips.

2. The game table according to claim 1, wherein the game board includes a plurality of predefined player gameplay positions on a top surface thereof and a plurality of player position antennas disposed on a bottom surface thereof, each of the plurality of the predefined player positions being disposed on the top surface so as to maintain substantial registration with a respective player position antenna of the plurality of player position antennas.

3. The game table according to claim 1, further comprising a hinge mechanism disposed toward the rearward side of the game board such that the front side of the game board is raiseable and lowerable.

4. The game table according to claim 1, further comprising an opening auxiliary device that, when operated when the game board is in a closed position, partially raises the game board relative to a game table surface so as to form a space between the game board and an upper stage portion of the game table.

5. The game table according to claim 1, further comprising a braking device that applies a biasing force that assists with for braking an opening and closing operation of the game board.

6. A game table, comprising a registration antenna that reads game chip identification information stored on one or more game chips, the game chip identification information transmitted to a database that validates the one or more chips;

an erasure antenna that reads game chip identification information stored on the one or more game chips, the game chip information transmitted to a database that invalidates the one or more game chips; and, a player position antenna module including: a plurality of antennas that read identification information stored in the one or more game chips via wireless communication and a housing for housing the plurality of antennas.

7. The game table according to claim 6, further comprising a game board including a plurality of predefined player gameplay positions on a top surface thereof and a plurality of player position antenna modules detachably securably disposed on a bottom surface thereof, each of the plurality of the predefined player positions being disposed on the top surface so as to maintain substantial registration with a respective player position antenna module of the plurality of player position antennas.

8. The game table according to claim 6, wherein the player position antenna module includes:

an adjusting part for adjusting electromagnetic waves outputted from each of the antennas; and a through hole formed at a position corresponding to a position of the adjusting part.

9. The game table according to claim 7, wherein the game board has a front-side corresponding to a player position and a rearward side corresponding to a dealer position, wherein the game board is raiseable and lowerable at the front side of the game board.

10. A game table, comprising:

a registration antenna; and, an erasure antenna, wherein, each of the registration and erasure antennas are in electronic communication with a database that stores game chip identification information, wherein, the registration antenna reads game chip identification information stored on one or more game chips, the chip identification information is electronically transmitted to the database, the database associates the chip identification information with a game player to thereby validate the one or more game chips, and wherein, the erasure antenna reads game chip identification information stored on the one or more game chips, the chip identification information is electronically transmitted to the database, the database disassociates the chip identification information associated with the game player to thereby invalidate the one or more game chips.

11. The game table according to claim 10, further comprising a reference antenna that reads the chip identification information stored on the one or more game chips, the registration antenna and the erasure antenna being arranged so as to sandwich the reference antenna between the registration antenna and the erasure antenna.

12. The game table according to claim 11, further comprising an operation switch for setting the reference antenna in an operating state.

13. The game table according to claim 11, further comprising a chip tray that stores the one or more game chips, the reference antenna being arranged so as to be sandwiched between the chip tray and player bet regions.

14. The game table according to claim 1, further including a game table control apparatus in communication with a server including the database, wherein, the game chip information read by the registration antenna and the erasure antenna is transmitted to and from the server via the game table control apparatus.

15. The game table according to claim 6, further including a game table control apparatus in communication with a server including a database, wherein, the game chip information read by the registration antenna and the erasure antenna is transmitted to and from the server via the game table control apparatus.

16. The game table according to claim 10, further including a game table control apparatus in communication with a server including the database, wherein, the game chip information read by the registration antenna and the erasure antenna is transmitted to and from the server via the game table control apparatus.

* * * * *